US011871179B1

(12) United States Patent
Van Den Abeele

(10) Patent No.: US 11,871,179 B1
(45) Date of Patent: Jan. 9, 2024

(54) AUDIO AND MUSICAL INSTRUMENT AMPLIFICATION AND LOUDSPEAKER SYSTEM

(71) Applicant: John Patrick Van Den Abeele, Mishawaka, IN (US)

(72) Inventor: John Patrick Van Den Abeele, Mishawaka, IN (US)

( * ) Notice: Subject to any disclaimer, the term of this patent is extended or adjusted under 35 U.S.C. 154(b) by 0 days.

(21) Appl. No.: 17/734,112

(22) Filed: May 2, 2022

(51) Int. Cl.
*H04R 1/28* (2006.01)
*H04R 1/02* (2006.01)
*H04R 3/00* (2006.01)

(52) U.S. Cl.
CPC ........... *H04R 1/2826* (2013.01); *H04R 1/023* (2013.01); *H04R 1/025* (2013.01); *H04R 1/288* (2013.01); *H04R 3/00* (2013.01)

(58) Field of Classification Search
CPC .. H04R 1/2815; H04R 1/2819; H04R 1/2826; H04R 1/023; H04R 1/025; H04R 1/288; H04R 3/00
See application file for complete search history.

(56) References Cited

U.S. PATENT DOCUMENTS 2,751,997 A * 6/1956 Gately, Jr. ............ H04R 1/2865 181/152
2,986,229 A * 5/1961 Perkins, Jr. .......... H04R 1/2865 181/199
5,012,889 A * 5/1991 Rodgers ............... H04R 1/2819 381/349
5,602,367 A * 2/1997 Meyer .................. H04R 1/2819 181/160
11,503,390 B2 * 11/2022 Lee ...................... H04R 1/2888
2007/0036369 A1 * 2/2007 Davi ...................... H04R 1/023 381/190
2015/0382090 A1 * 12/2015 Bisset ...................... H04R 1/30 381/386
2022/0030350 A1 * 1/2022 Coakley ............. B01J 20/28059
2022/0201384 A1 * 6/2022 Ren ...................... H04R 31/006

* cited by examiner

*Primary Examiner* — Jason R Kurr

(57) ABSTRACT

Innovative apparatus and methods that improve the articulate amplification and reproduction of performed and recorded audio material including loudspeaker crossover and loudspeaker enclosure tuning methods, dual chamber reflex loudspeaker enclosure configurations, loudspeaker enclosures stiffened by trusses, loudspeaker chambers each filled with a monolithic block of acoustical damping material, loudspeaker grille acoustic filters, preamplifier and amplifier features, and signal transmission cables and connectors configured and sized for optimum acoustic articulation and reliability. Also included is a method for advantageously positioning handles, straps, and support stand receptacles. This patent owner's exclusive rights are hereby established to advertise, assemble, assign, manufacture, sell, license, use and protect from infringement (a) the claimed audio or musical instrument amplification system, and (b) each individually claimed innovation, and thereby (c) every combination and permutation of individually claimed innovations and (d) every combination and permutation of individually claimed innovations included in alternative audio or musical instrument amplification systems.

17 Claims, 23 Drawing Sheets

Figure 1:
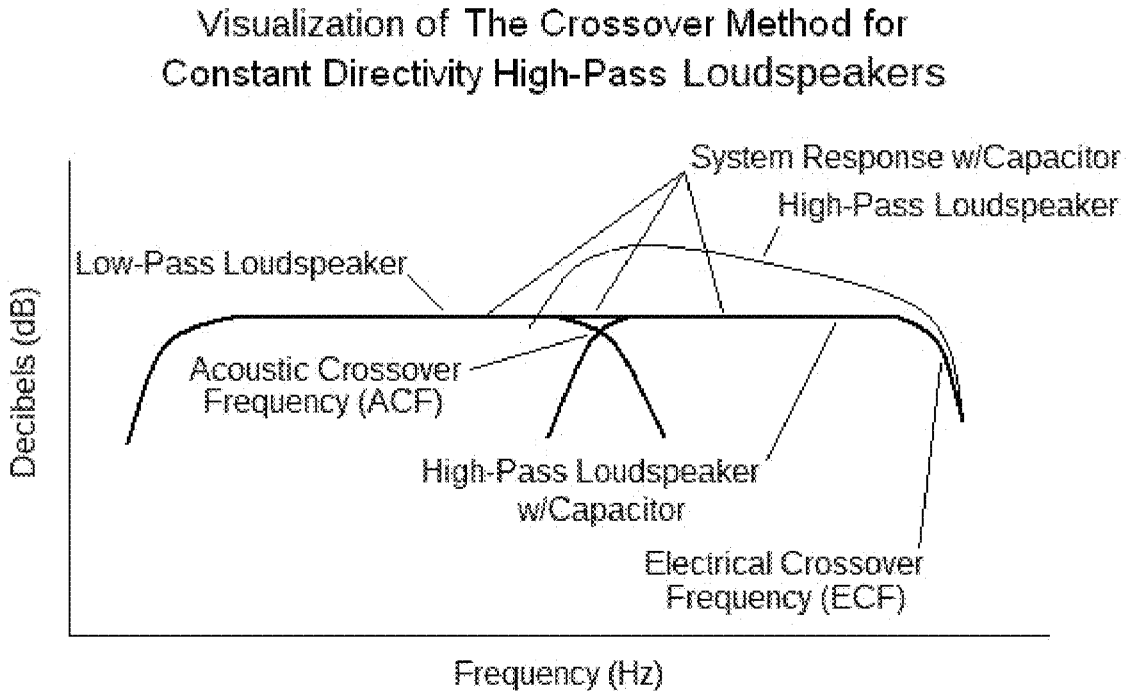

Dual Chamber Reflex Enclosures with Oblique Partition

Examples of Acoustic Grille Filter Hook Pad Arrays
Shown within Projected Areas of Round Acoustic Grille Filters Dual Chamber Reflex Enclosures with Oblique Partition Dual Chamber Reflex Horns with Oblique Partition 2-way Dual Chamber Reflex with Oblique Partition 2-way Dual Chamber Reflex with Oblique Partition a b c d Dual Chamber Reflex with Laterally Oblique Partition e f g h Dual Chamber Reflex with Oblique Partition & Trussed Struts Example of a Monolithic Block of Acoustic Damping Material Sculpted to Fit a Loudspeaker Enclosure Wiring Diagram for High-Pass Enclosure
With Integral Cable(s) and/or Jacks/Terminals Wiring Diagram for Low-Pass Enclosure
With Integral Cable(s) and/or Jacks/Terminals Wiring Diagram for Two-Way Enclosure With Integral Cable(s) and/or Jacks/Terminals Wiring Diagram for Two-Way Enclosure With Biamp Capability Redundant Ground XLR Wiring

Note: The above configurations can be used interchangeably.

Caution: XLR pin polarities have not always been standardized.

Redundant Ground 2 Conductor Phone Plug & Jack Wiring
(Jacks Wired Same as Plugs)

Note: This configuration will also mate with redundant ground 3 conductor phone plugs and jacks Redundant Ground 3 Conductor Phone Plug & Jack Wiring
(Jacks Wired Same as Plugs)

a b c

Note: These configurations will also mate with 2 conductor phone plugs & jacks.

Jumbo Phone Plug Wiring with Integral Crossover

Redundant Ground Wiring of 2 Conductor Jumbo Phone Plug with Integral Crossover

Jumbo Phone Plug Wiring with Integral Crossover (For Jack Wired in Series with High-Pass Transducer)

Jumbo Phone Plug with Integral Semiconductor or Short (For Parallel or Serial Preamp Input Jack
to Vary Input Characterisitics/Sensitivity or Mute)

Positioning a Handle or Strap for Minimum Gravity Induced Hand Torque

Construction Lines are in Vertical Plane of Broomstick Axis at Balance Point
Draw Construction Lines on Bottom Surface to Position a Support Stand Receptacle

AUDIO AND MUSICAL INSTRUMENT AMPLIFICATION AND LOUDSPEAKER SYSTEM

CROSS-REFERENCE TO RELATED APPLICATION

This application claims the benefit of earlier filed application 60/656,446 filed on Feb. 24, 2005, application Ser. No. 11/362,396 filed Feb. 24, 2006, and all of the amendments to, and drawings for, application Ser. No. 11/362,396 filed from Mar. 17, 2006 through Jul. 6, 2021. Said 2006 application also claimed the benefit of said 2005 application.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention pertains to audio, electronic musical instrument, recording, and sound reinforcement equipment design and use.

Description of Related Art

Audio and Musical Instrument Amplification Systems:

Said systems can comprise microphones, musical instruments, recording and playback devices, preamplifiers, amplifiers, crossovers, loudspeakers, power cords and signal cables. Acoustic-sensory perception is used to adjust, compare, evaluate and select said components. The articulation and power these systems can provide are constrained by wall outlet ampacity and voltage and benefit from energy-efficient components.

Loudspeaker Crossovers:

Loudspeaker crossovers filter, distribute, equalize and control sound frequencies, can comprise capacitors, fuses, inductors, L-pads, resistors and switches that can expend power as heat, reduce efficiency and be vulnerable to connector/solder joint issues, contact oxidation, signal noise, vibration, and can cause distortion, phase and transient response issues. An inductive coil wired in series with a loudspeaker increases the length and reduces the conductivity of signal transmission, especially when wound with a lighter gauge conductor, thereby reducing system damping and compromising transient response. Power-consuming crossover components and un-biamplified mid/high-frequency loudspeakers can reduce low-frequency acoustic-sensory articulation. Thus said crossovers can compromise loudspeaker system reliability and acoustic-sensory characteristics that are not all quantifiable, measurable, or included in specifications.

Musical Instrument Loudspeaker Systems:

Said systems' high-frequency horns are often small with a high acoustic crossover frequency that can compromise off-axis frequency response caused by woofer directivity below said frequency. Small cone loudspeakers are usually less efficient than large cone loudspeakers and horns. Large cone loudspeakers can have an undesirable peak in axial high-frequency response. Plural loudspeakers can cause phase interference. Loudspeaker transient response specifications are less familiar, often not available, and important to musicians when nuance, skill and technique depend upon articulate acoustic-sensory response to tactile musical instrument input.

Loudspeaker Enclosures and Their Tuning:

Prior art dual chamber reflex loudspeaker enclosures have cuboid chambers which are vulnerable to undesirable acoustic reflections, resonance and standing waves. Bass reflex and dual chamber reflex loudspeaker enclosure ports tuned to the loudspeaker resonance frequency and sized for the loudspeaker's maximum power rating do not necessarily provide the most articulate overall sound at lower power & volume levels.

Amplifiers:

Amplifiers comprise conductors, connectors, semiconductors, controls, effects, switches and overload protection. The ampacity, conductivity, voltage rating, Q and other characteristics of amplifier components and non-essential circuits affect signal transmission and acoustic-sensory articulation. Daisy chaining/splitting electrical signal transmission to plural preamplifiers and/or plural amplifiers and/or plural loudspeakers can compromise said articulation.

SUMMARY OF RELATED ART

The articulate amplification and reproduction of performed and recorded audio material is incrementally improvable with a variety of ways and means.

BRIEF SUMMARY OF THE INVENTION

This application reveals what the inventor has found to be useful in improving the articulate amplification and reproduction of performed and recorded audio material and claims as a system of innovative devices and methods that are also claimed individually. The invention neither claims nor is exclusively applicable to the loudspeakers, manufacturer data, and capacitors cited herein for illustration purposes.

BRIEF DESCRIPTION OF THE SEVERAL VIEWS OF THE DRAWING(S)

The semi-schematic drawings show enough detail to differentiate and visualize the invention.

Most section views are more like cat-scans than manufacturing drawings and omit background detail. Some drawings show wall thicknesses and omit hatching because, like cat-scans, nearly everything but the air spaces would otherwise be hatched and obscure joint lines.

Figure 2:
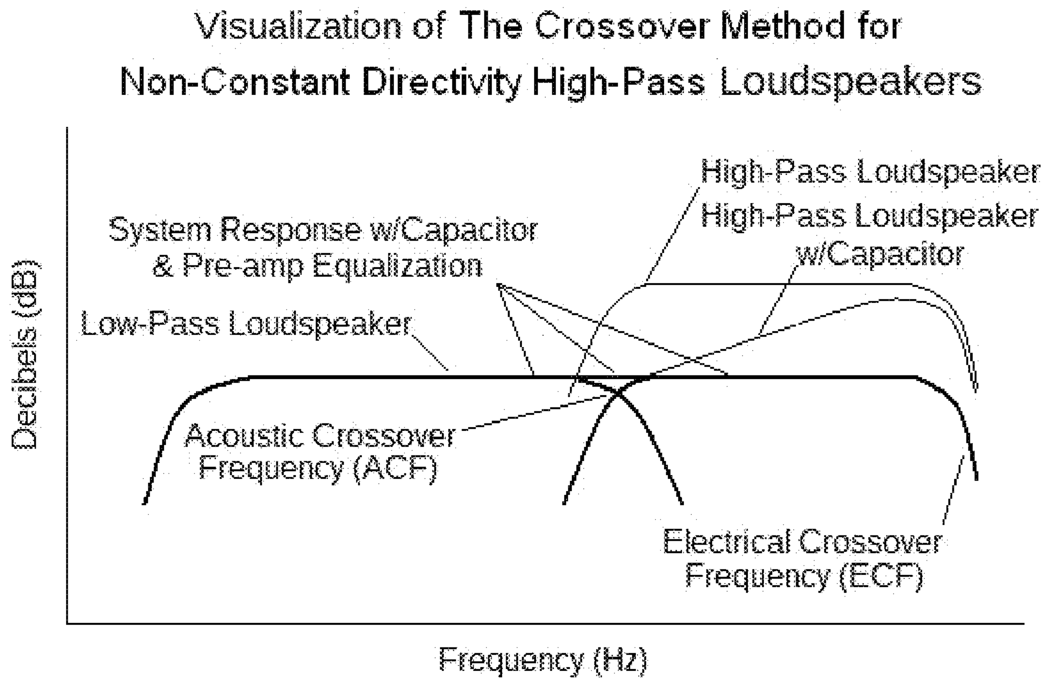

FIGS. 1-2: Visualizations of the crossover method.

Figure 3:
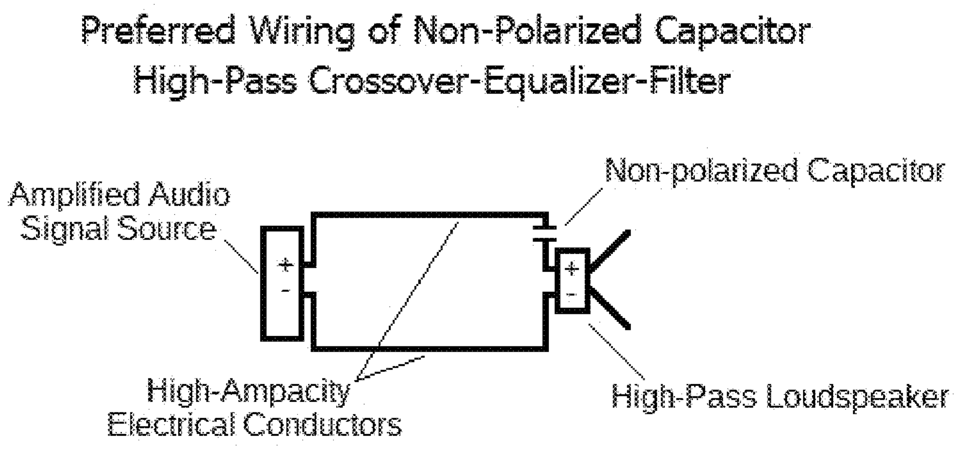

FIG. 3: Preferred wiring of the passive capacitive high-pass crossover.

Figure 4:
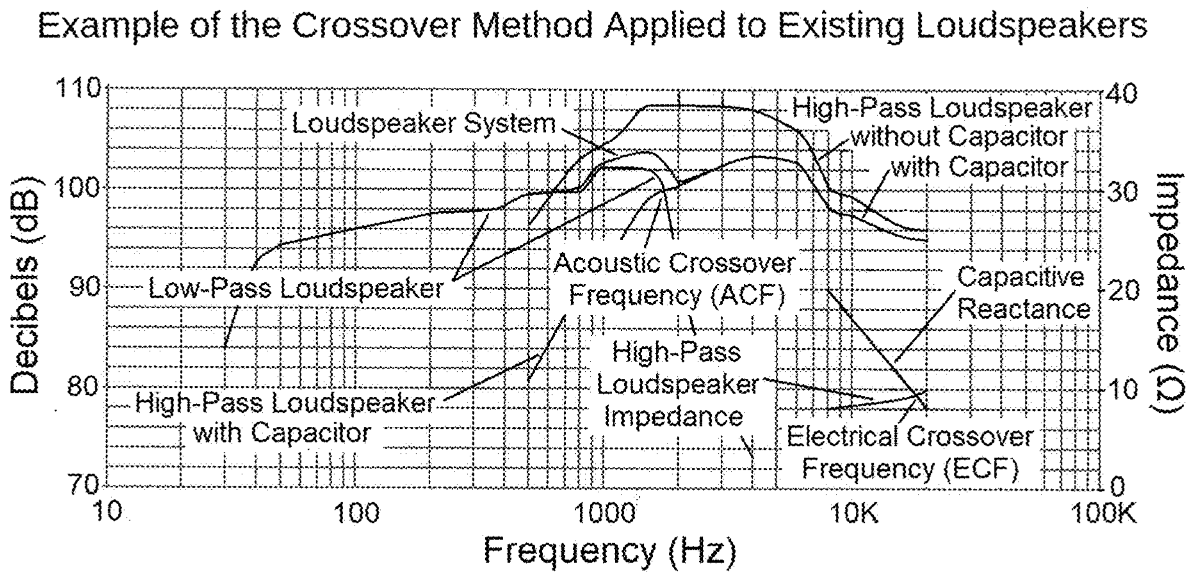
Figure 5:
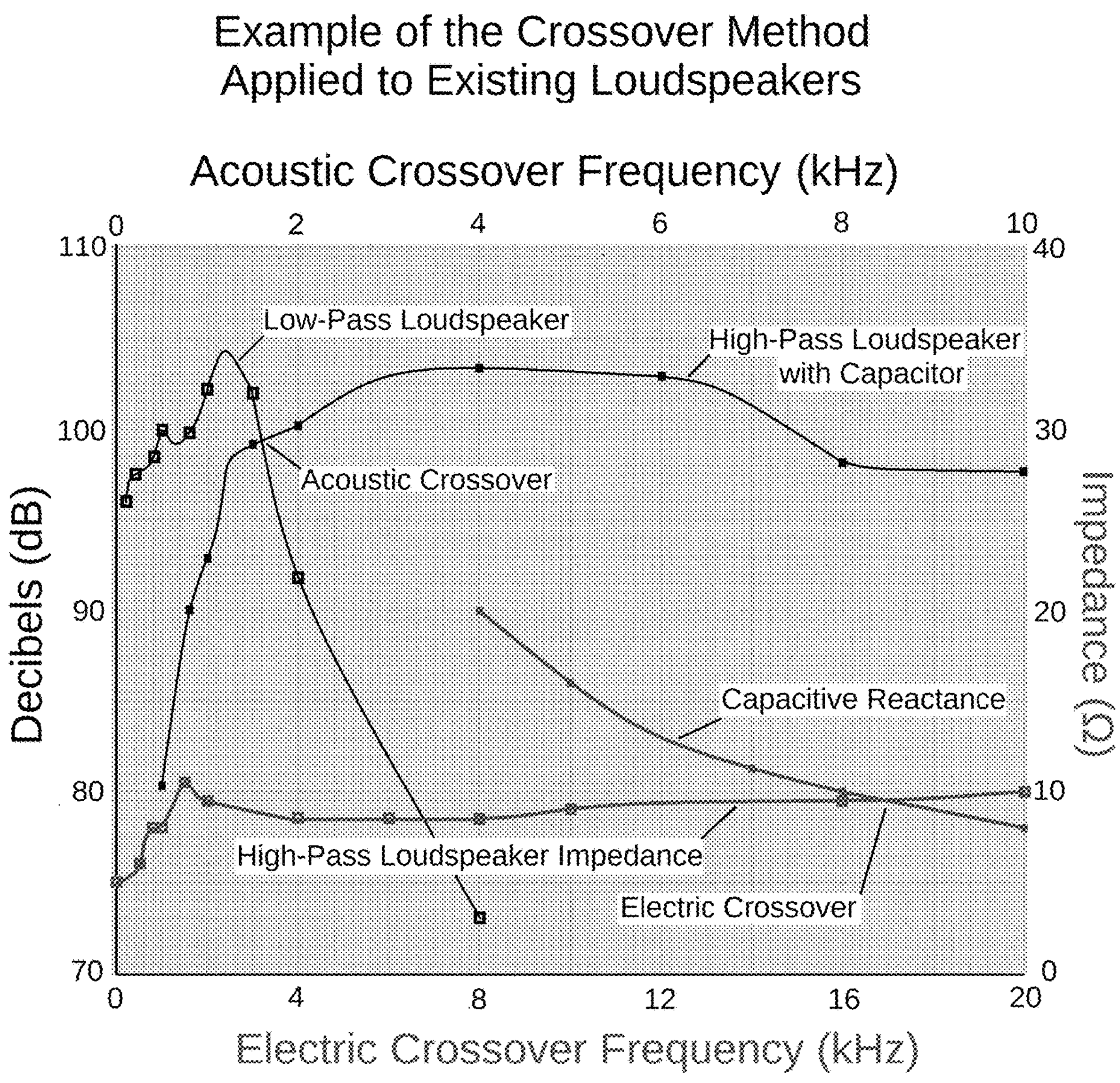
Figure 6:
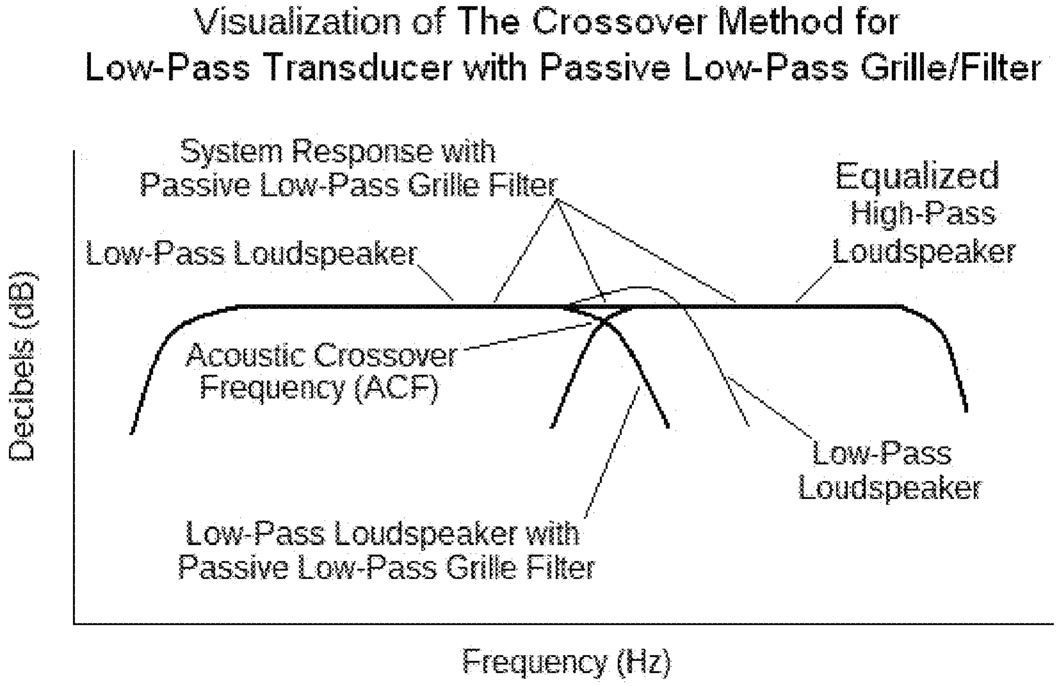

FIGS. 4-5: The crossover method applied to existing loudspeakers.

FIGS. 6-9: Visualizations of the passive acoustic grille filter.

Figure 10:
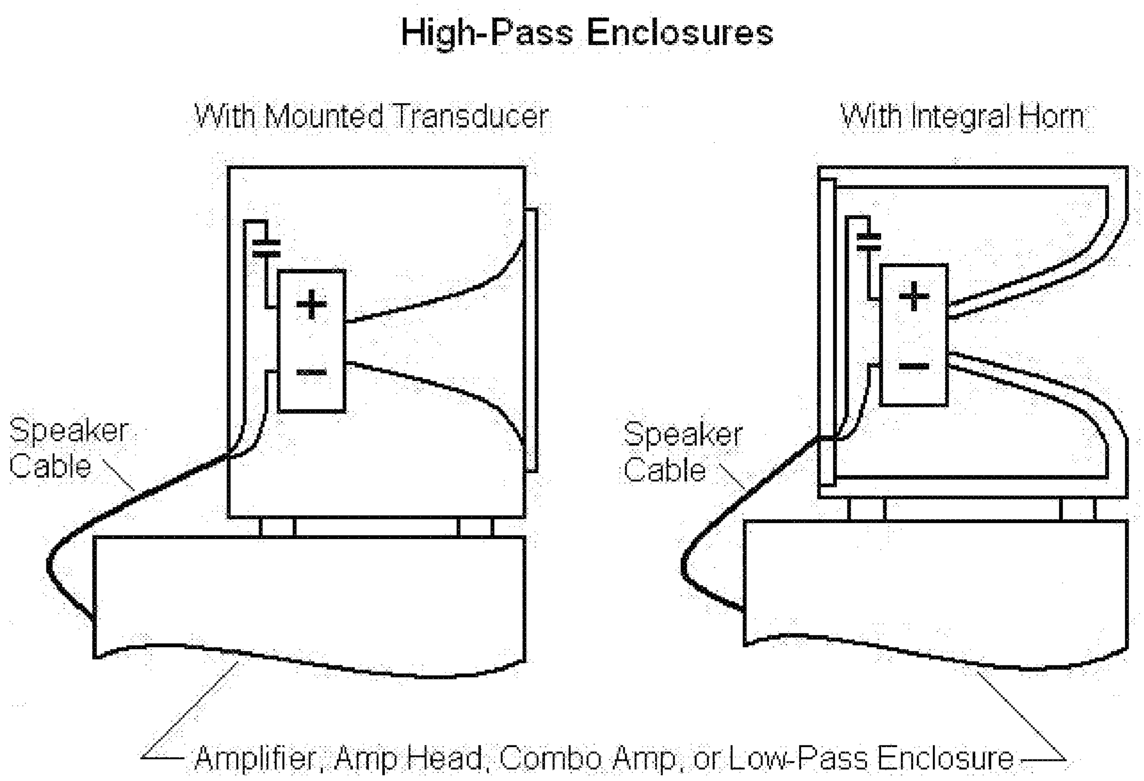
Figure 11:
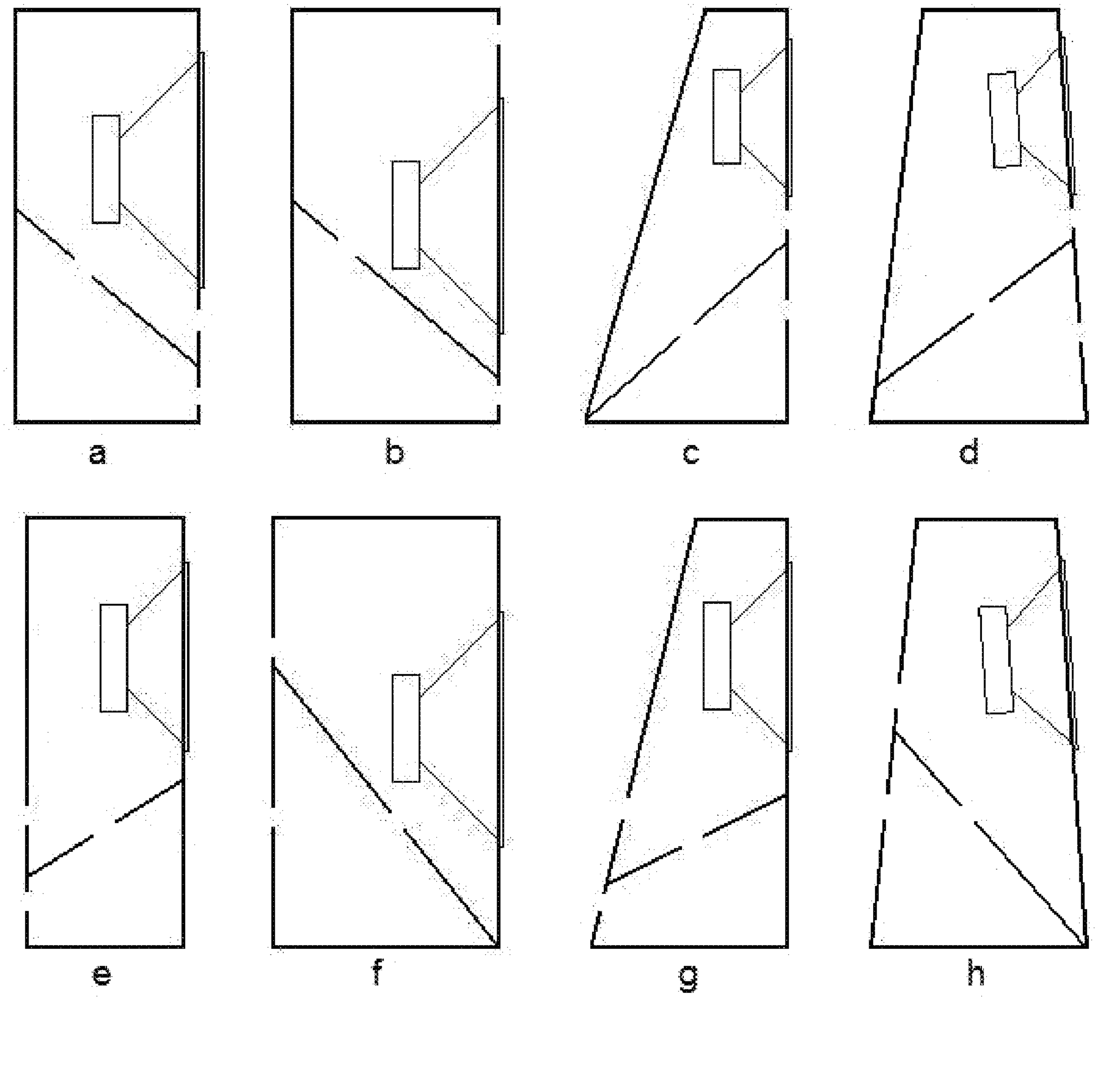
Figure 12:
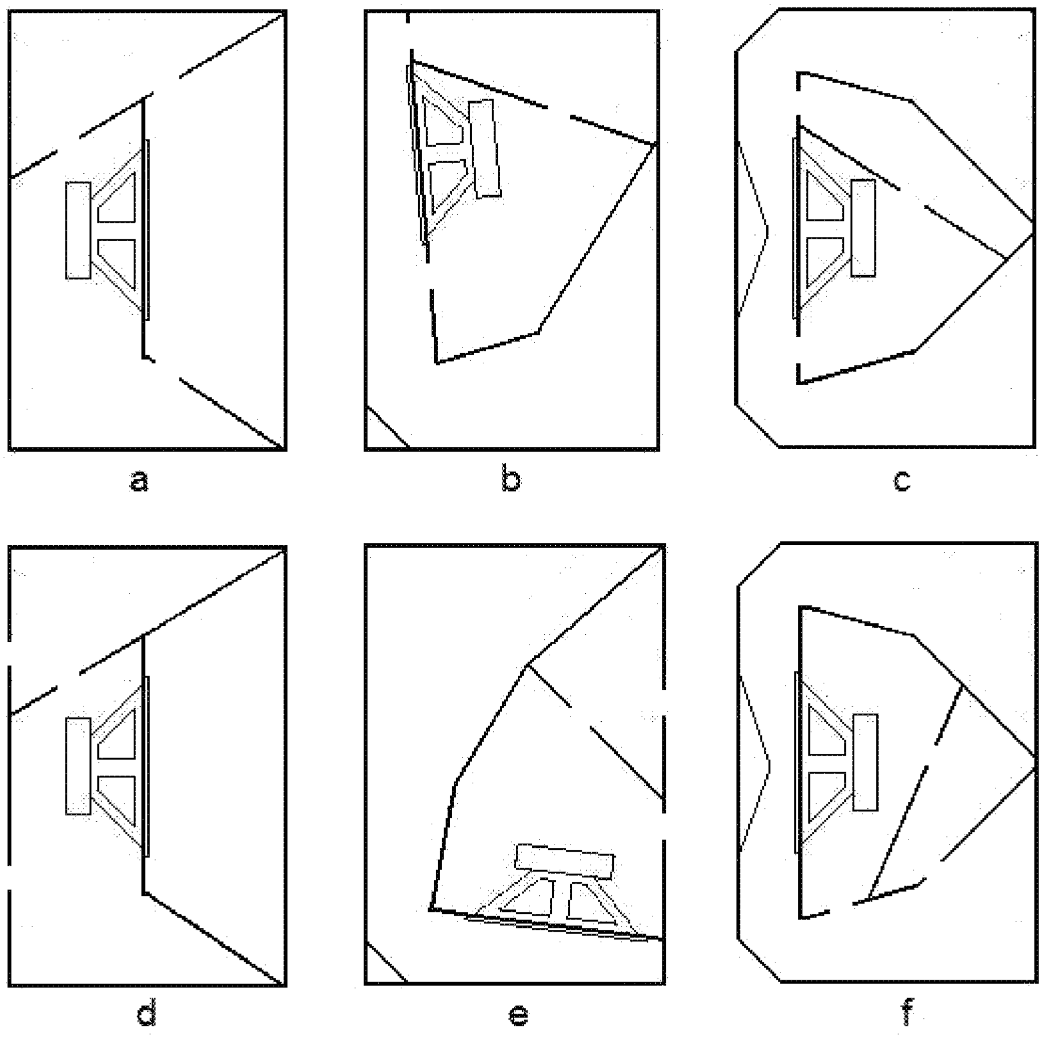
Figure 13:
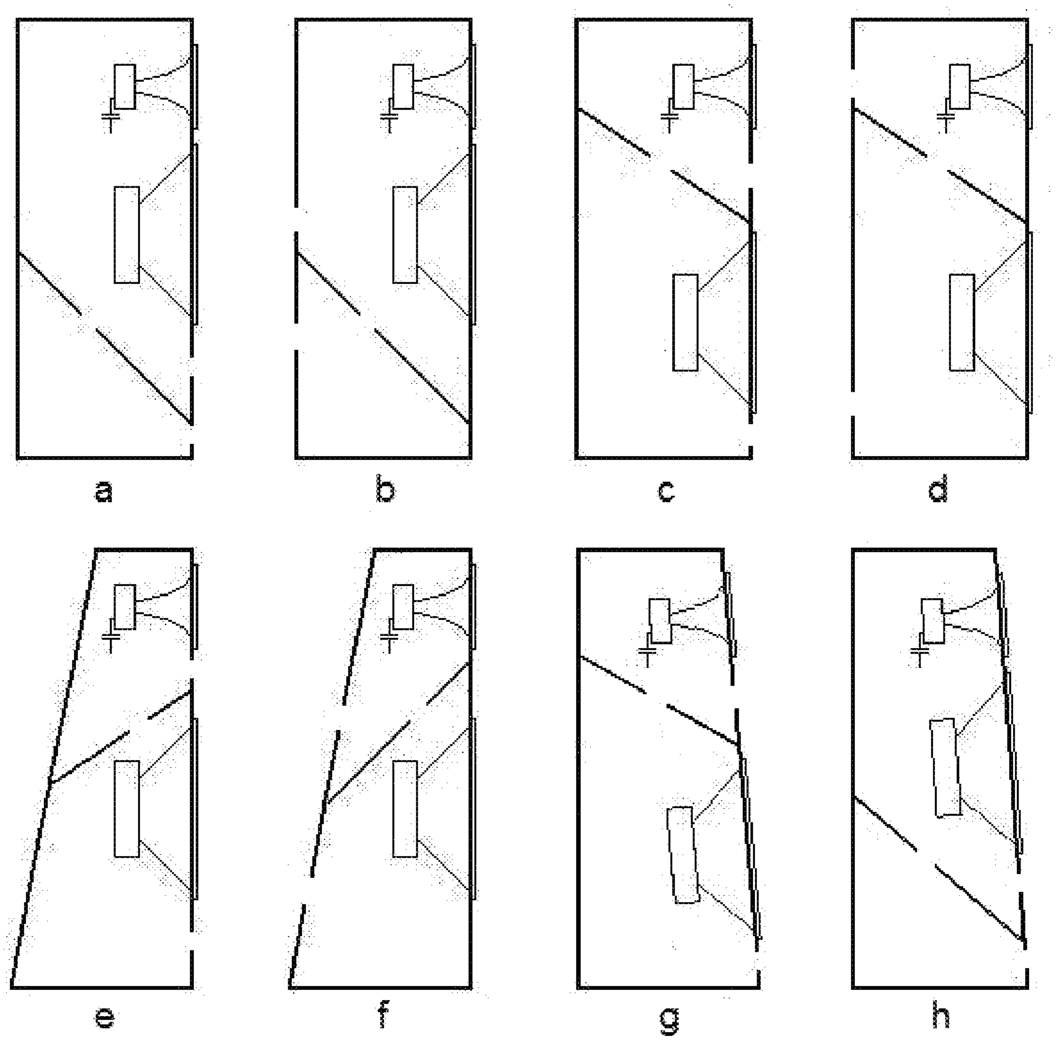

FIG. 10: High-pass loudspeaker enclosures.

FIGS. 11-15: Dual chamber reflex loudspeaker enclosures with non-cuboid chambers.

Figure 16:
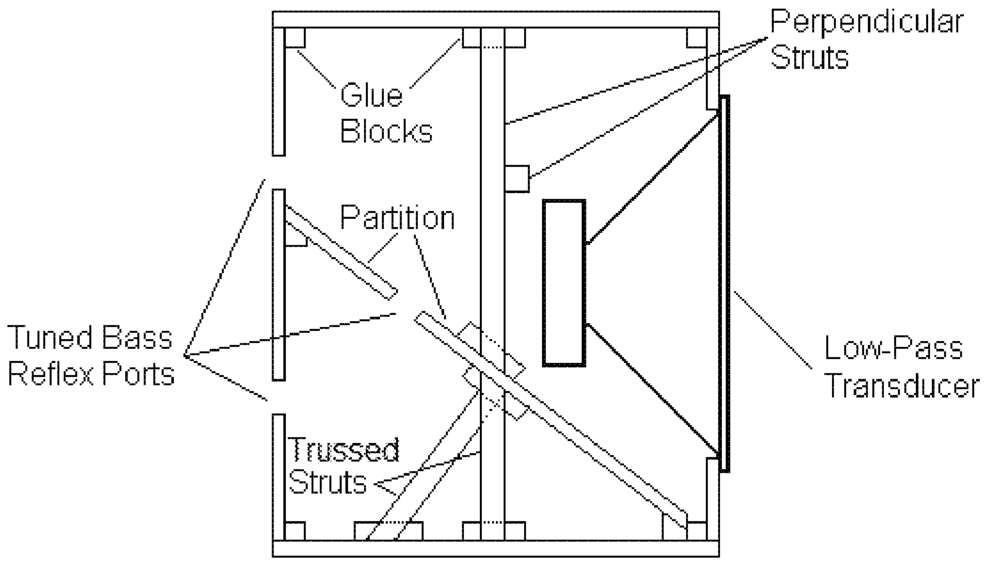

FIG. 16: A loudspeaker enclosure comprising struts.

Figure 17:
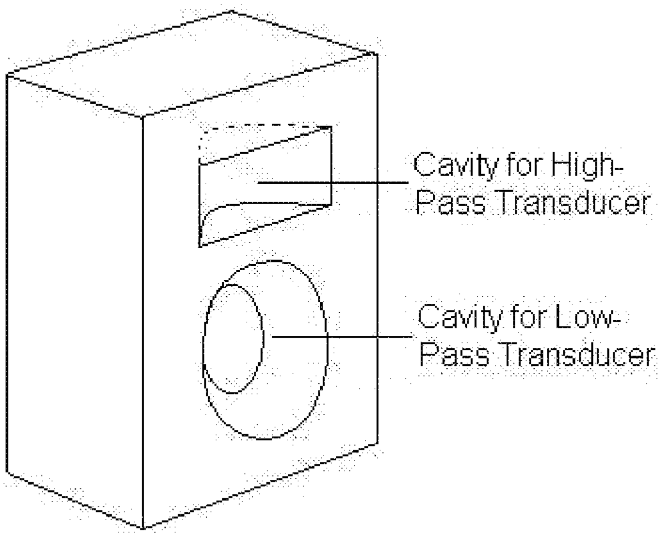
Figure 18:
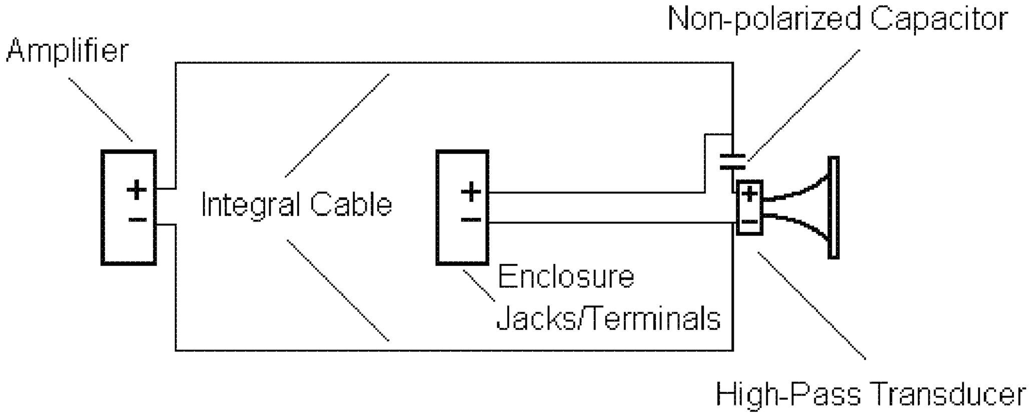
Figure 19:
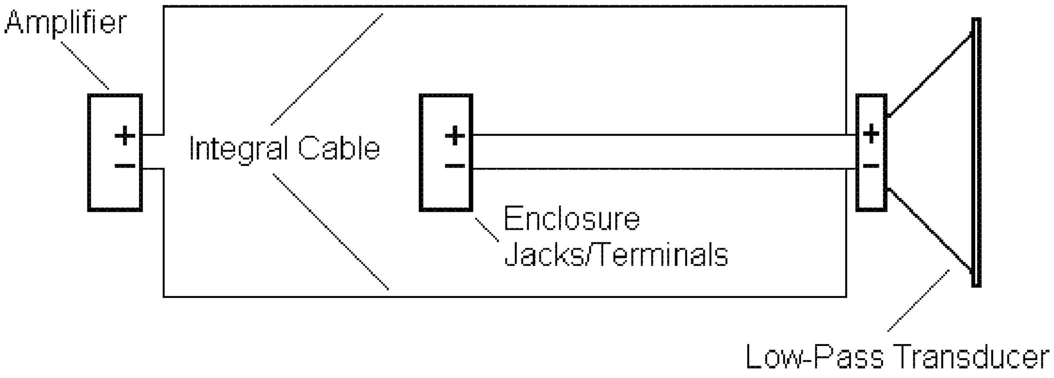
Figure 20:
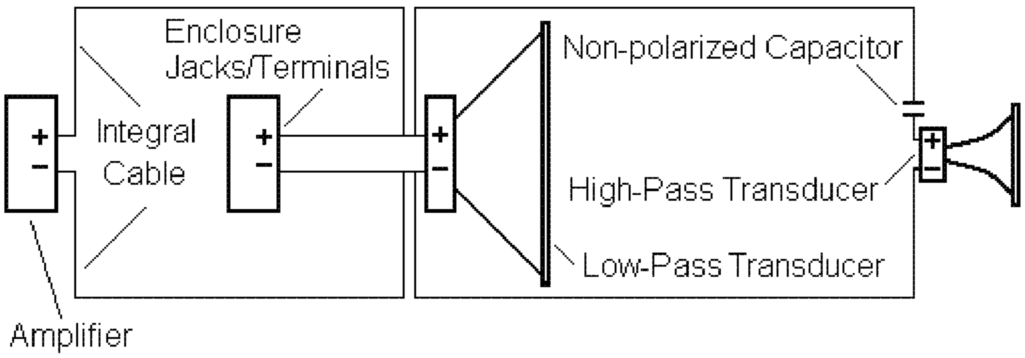
Figure 21:
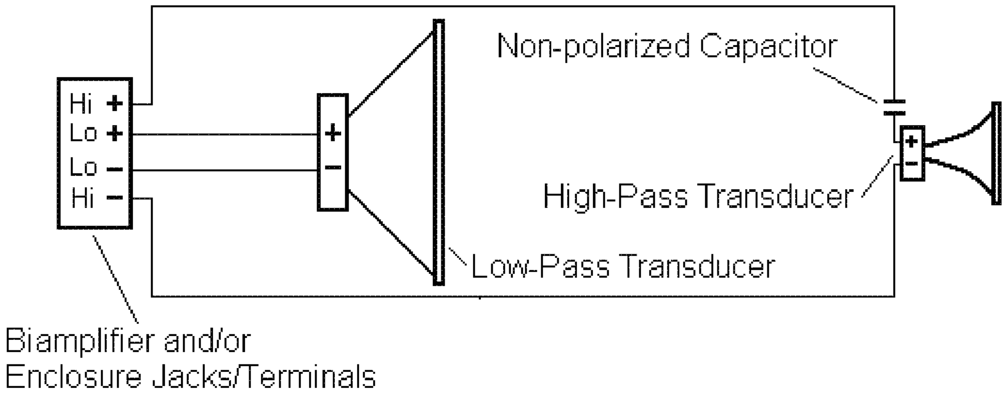

FIG. 17: A monolithic block of acoustic damping material.

FIGS. 18-21: Loudspeaker enclosure wiring diagrams.

FIGS. 22-25: Redundant ground connector wiring.

FIGS. 26-29: Signal cable connector with integral crossover or semiconductor.

Figure 30:
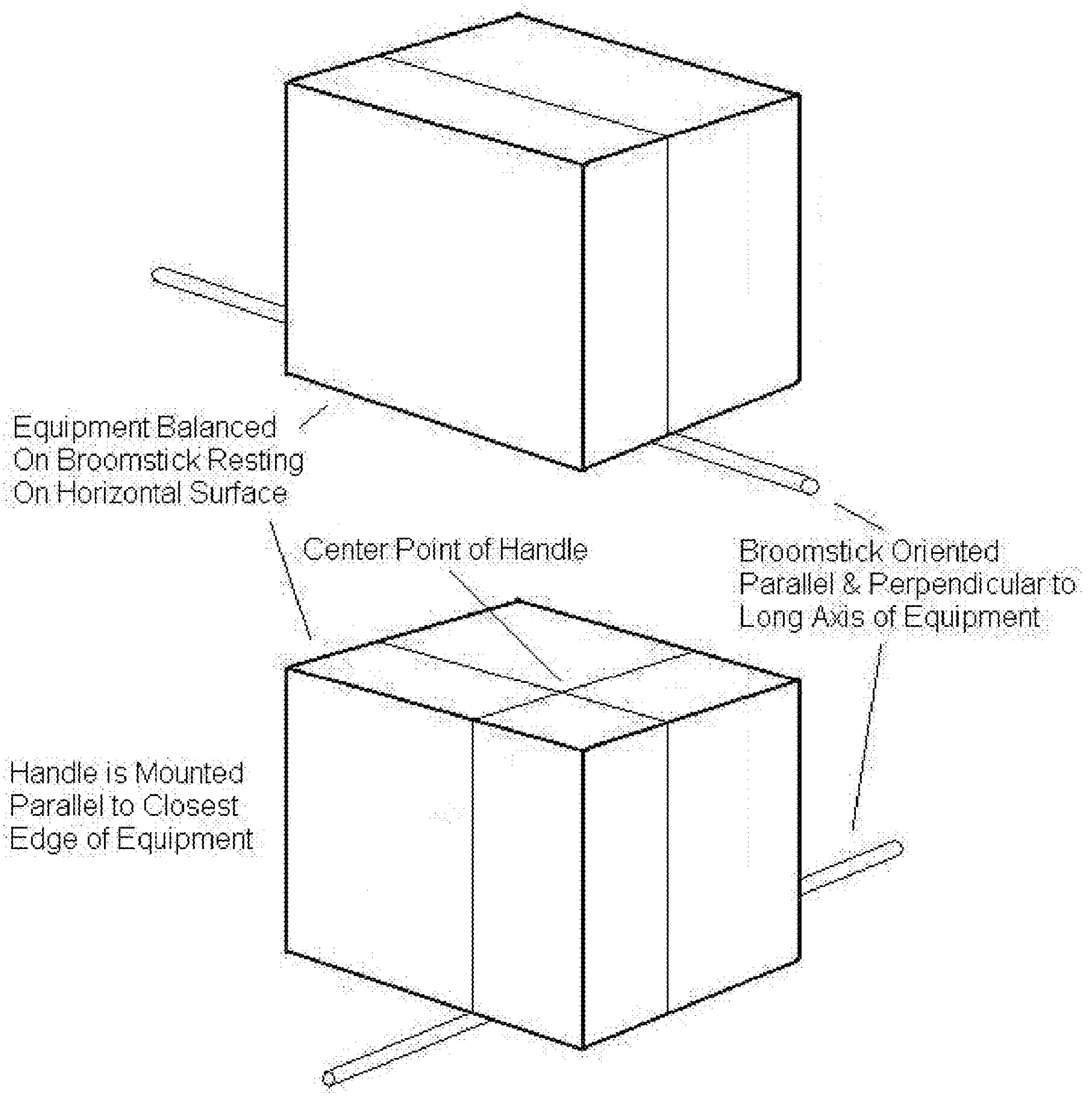

FIG. 30: Positioning handles, straps, and support stand receptacles.

DETAILED DESCRIPTION OF THE INVENTION

The Crossover Method

For purposes of the following discussion the following terms are presented:

a) The acoustic crossover frequency, acronymed "ACF", is the frequency at which the high-pass and low-pass loudspeakers contribute equally to their combined acoustic output.

b) The electrical crossover frequency, acronymed "ECF", is the frequency at which the capacitive reactances of the high-pass crossover capacitor and high-pass loudspeaker are equal.

The claimed crossover method as illustrated in FIGS. 1 and 2 was inspired in the late 1990's when noticing that the unequalized frequency response of constant directivity high frequency horns* and capacitive reactance are both inversely related to signal frequency and by the fact that that a capacitor consumes no power. Thus said response is conducive to flattening by the roll-off of said response provided by a non-polarized capacitor wired in series with a said horn in which the electrical crossover frequency approximates or equals the maximum usable frequency of said horn. Frequency response curves of several brands and models of constant directivity horns indicated said inverse relationship is an inherent characteristic of said horns. The claimed crossover method can also be applied to a non-constant directivity high-pass loudspeaker that has flat unequalized frequency response with further active preamplifier equalization above the acoustic crossover frequency. The relationship between the capacitive reactance of a capacitor and signal frequency is determined by its capacitance and is otherwise invariable, unlike loudspeaker transducer impedance and frequency response which are determined by design. Therefore, loudspeakers and loudspeaker systems designed for optimized acoustic-sensory performance with passive loudspeaker crossover equalization and filtering of only high-pass loudspeakers, with said equalization and filtering solely attributable to capacitive reactance, obviate power consuming complex and compromising passive crossover circuits.

*Renkus-Heinz (1982) "SSD 1800 Compression Driver", Technical Data Sheet RH 112-3882.

*Renkus-Heinz (1983) "CBH 1600 Constant Beamwidth Horn", Technical Data Sheet RH 116-40/82.

Unlike conventional passive loudspeaker crossover systems comprising coincident acoustic and electrical crossover frequencies and power consuming/dissipating semiconductors that equalize loudspeakers and eliminate speaker frequency range overlap, the claimed crossover method provides improved acoustic-sensory articulation by using a novel electrical crossover frequency that is octaves higher than the resulting acoustic crossover frequency with high-pass and low-pass loudspeakers that have complementary frequency ranges and with said high-pass loudspeaker having higher sensitivity than that of said low-pass loudspeaker. Said low-pass loudspeaker's inherent inductive reactance and high-frequency roll-off function as the passive low-pass filter. A non-polarized high-pass filter capacitor passively filters and equalizes said high-pass loudspeaker thereby providing a complementary acoustic crossover frequency with said low-pass loudspeaker for full range frequency response and articulate low-frequency transient response free of the compromises of conventional passive crossovers.

The claimed crossover method's electrical crossover frequency being octaves higher than the acoustic crossover frequency, the low-pass loudspeaker's inductive reactance, and the inverse relationship between solid state amplifier power output and impedance, result in only a small fraction of the applied power being distributed to the high-pass loudspeaker at the acoustic crossover frequency and to the low-pass loudspeaker at the electrical crossover frequency. Since the low-pass loudspeaker does not determine the electrical crossover frequency, a high-pass loudspeaker, or high-pass loudspeaker enclosure, comprising said method can be wired in parallel with a low-pass loudspeaker, connected/daisy-chained in parallel with a low-pass loudspeaker enclosure, or bi-amplified, and can obviate passive crossover fuses and protection circuits and active high-pass filters. A/B tests indicate that high-pass loudspeaker fuses provide less acoustic-sensory articulation than a bypass wire.

FIG. 3 illustrates a preferred high-pass loudspeaker crossover wiring configuration. The high-pass crossover capacitor and high-pass loudspeaker are wired in series and connected or wired to an amplified audio signal source either directly to an amplifier or via a low-pass loudspeaker enclosure signal terminals. A/B tests of acoustic-sensory articulation indicate the optimum said configuration is with said capacitor, the + terminal(s) of loudspeaker(s), the + terminal of loudspeaker enclosure input(s), and the + terminal of amplifier/bi-amplifier loudspeaker output(s) on the same side of the circuit. Mismatched loudspeaker polarity and crossovers wired in series with the − side of the high-pass circuit are acoustically disadvantageous, electrically inefficient, and attempts to actively boost polarity-negated frequencies risk loudspeaker overload.

The crossover capacitor voltage rating should exceed the applied voltage by the amount required to produce the reliability and acoustic-sensory articulation desired. High voltage crossover capacitors produced more articulate sound than low voltage capacitors in A/B tests perhaps because high voltage resistance to exploding means less energy wasting deflection. The Q and other capacitor characteristics also affect the sound quality and capacitor selection. Said characteristics not specified or understood can often be comprehensively assessed by A/B test comparisons made by listening or by feeling the response to playing a musical instrument. Sonically advantageous capacitors are acceptable for any reason, whether or not said reason is known, explained by physics or theory, quantifiable, or technologically detectable, measurable, or separable from other variables.

Figure 26:
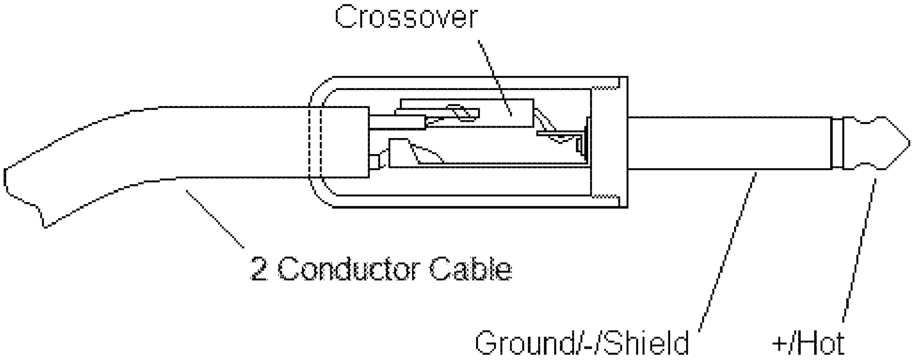
Figure 27:
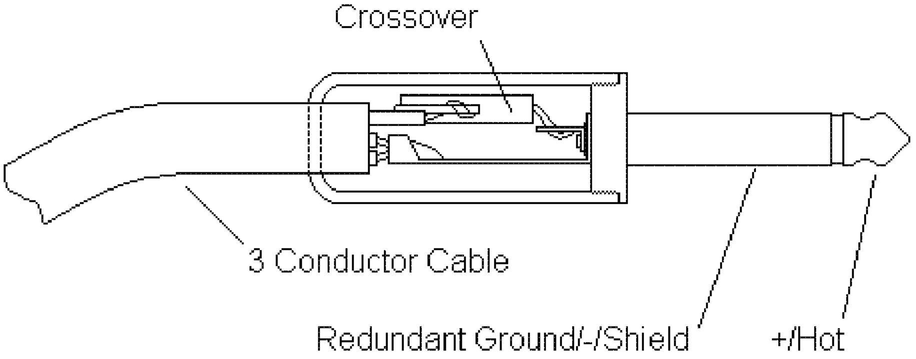
Figure 28:
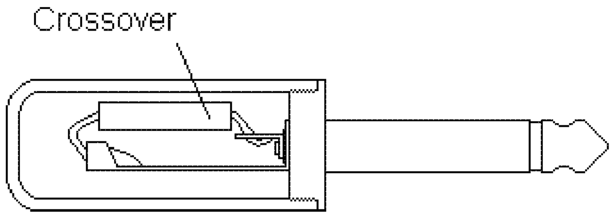

Said crossover will also fit inside the connector of a high-pass signal transmission cable. FIGS. 26 and 27 illustrate signal cable connectors with integral crossovers, one of which also comprises a redundant ground. FIG. 28 shows a signal connector plug comprising an integral crossover for use with a jack wired in series with a high-pass loudspeaker.

The claimed crossover method's high-pass loudspeaker roll-off as illustrated in FIG. 4 and discussed below is 1 dB at the electrical crossover frequency, 2 dB one octave below said frequency, 4 dB two octaves below said frequency, 7.5 dB three octaves below said frequency, 12 dB four octaves below said frequency, and 16 dB five octaves below said frequency. Said roll-off of the depicted loudspeakers is 9 dB at, and 4 dB/octave below, the acoustic crossover frequency. Roll-offs from 4 dB two octaves below the electrical frequency to 16 dB five octaves below said frequency offer a wide range of potential complementary acoustic crossover frequencies that are each at least 2 octaves below their respective electric crossover frequencies. Said roll-off provides more overload protection than that of a capacitor that provides coincident acoustic and electrical crossover frequencies without the compromises of passive crossover overload protection devices and power dissipating semiconductors.

Said method minimizes the power diverted from an un-biamplified low-pass loudspeaker for articulate low-frequency response while providing the minimal power required of a higher sensitivity high-pass loudspeaker for full range system frequency response. A/B tests comparing said method with conventional 6 dB and 12 dB per octave crossovers with home audio, musical instrument, and sound reinforcement loudspeaker systems indicate that acoustic-sensory articulation of the tactile input of bass guitar is enhanced by accurate loudspeaker system low-frequency transient response that is improved by said method.

Charts, graphs and nomograms intended for designing conventional crossovers or predicting roll-off rates may not be applicable to the claimed crossover method. Instead, basic physics equations allow semiconductor and loudspeaker data to be used to calculate loudspeaker system electrical crossover frequency, impedance, power distribution, frequency response and determine the acoustic crossover frequency as illustrated in FIGS. 4-6 and 9 and presented below:

A. Capacitance at any Electrical Crossover Frequency (ECF)

The value of the high-pass crossover capacitor/capacitance (C farads) required for capacitive reactance (Xc ohms) to equal the impedance of the high-pass loudspeaker (Za) at an electrical crossover frequency (f hertz) is $C=1/[2\pi fZa]$ farads. When C is desired in microfarads (μF), then $C=10^6/[2\pi fZa]$ microfarads (μF).

B. Electrical crossover frequency (ECF) for an available capacitance Capacitors available in incremental values determine the choices available for the electrical crossover frequency. An available capacitor/capacitance (C) provides capacitive reactance (Xc) that equals the impedance of the high-pass loudspeaker (Za) when the above equation for capacitance (C farads) is solved for $f=1/[2\pi CZx]$ hertz. When C is microfarads (μF), then $f=10^6/[2\pi CZx]$ hertz.

C. Power Distribution

For 1 Watt of loudspeaker system signal input, high-pass loudspeaker impedance (Za ohms), capacitive reactance (Xc ohms), and low pass loudspeaker impedance (Zb ohms), all at any frequency (f), the high-pass loudspeaker receives $Pa=Zb/(Za+Xc+Zb)$ Watts and the low-pass loudspeaker receives the remainder, i.e. $Pb=1-Zb/(Za+Xc+Zb)$ Watts.

D. Power Distribution Sound Pressure Variation

The variation in high-pass loudspeaker frequency response (Δra) attributable to the above power distribution (Pa) at frequency (f) is $\Delta ra=10\log Pa$ decibels. The variation in low-pass loudspeaker frequency response (Δrb) attributable to the above power distribution (Pb) at frequency (f) is $\Delta rb=10\log Pb$ decibels.

E. Loudspeaker System Frequency Response with the High-Pass Crossover Capacitor

At frequency (f) the high-pass loudspeaker frequency response (Rsa) attributable to its inherent frequency response (Ra) and the above power distribution sound pressure variation (Δra) is $Rsa=Ra+\Delta ra$ decibels, and the low-pass loudspeaker frequency response (Rsb) attributable to its inherent frequency response (Rb) and the above sound pressure variation (Δrb) is $Rsb=Rb+\Delta rb$ decibels. The combined 2-way loudspeaker system frequency response (Rs) at frequency (f) is $Rs=10\log[10\hat{}(Rsa/10)+10\hat{}(Rsb/10)]$ decibels.

F. The 2-Way Loudspeaker System Acoustic Crossover Frequency (ACF)

The acoustic crossover frequency is the frequency at which the frequency response of the high-pass and low-pass loudspeakers graphically intersect and are equal, i.e. Rsa=Rsb.

There are less mathematically rigorous variations of the claimed passive capacitive high-pass crossover method identifiable by the novel electrical crossover frequency that is at or near the highest usable frequency of the high-pass loudspeaker and octaves above the resulting acoustic crossover frequency with a low-pass loudspeaker, including but not limited to the following:

a) A 2-way loudspeaker system comprising a passive capacitive high-pass electrical crossover, a high-pass loudspeaker, and a low-pass loudspeaker, preferably with no passive low-pass crossover, with said high-pass crossover providing an electrical crossover frequency with said high-pass loudspeaker that is solely attributable to capacitive reactance and octaves above the maximum usable frequency of said low-pass loudspeaker.

b) A high-pass loudspeaker enclosure comprising a high-pass loudspeaker and a passive capacitive high-pass electrical crossover, with said crossover providing an electrical crossover frequency with said loudspeaker that is solely attributable to capacitive reactance and that approximates or equals the maximum usable frequency of said loudspeaker.

FIGS. 4-5 illustrate the an application of the crossover method to a loudspeaker system comprising a 15" low-frequency loudspeaker enclosure and a high-frequency loudspeaker system comprising a constant directivity horn and driver wired in series with a non-polarized 1 μF capacitor.* Said low-frequency loudspeaker and said high-frequency loudspeaker system constitute a parallel audio signal circuit. The un-equalized axial loudspeaker frequency responses comprise data points from manufacturer frequency response curves*. Equalized data was calculated using equations A thru F above. Manufacturer data indicates the constant directivity horn has a −6 dB horizontal beam width of 109° 11° from 800-12500 Hz and 75° at 16000 Hz, the horn's average vertical beam width is 72°, and the woofer's beam width is at least 100° up to 1000 Hz.* Said capacitor provides a 17000 Hz high-pass electrical crossover frequency resulting in a 1600 Hz acoustic crossover frequency as shown in FIGS. 4 and 5. At said acoustic crossover frequency a system beam width of about 810 horizontal and 64° vertical is estimated by averaging the beam widths of the high-pass and low-pass loudspeakers. Note that FIG. 5 comprises dual linear frequency response axes that ease reading of said crossover frequencies but unnaturally compress the range of the low-pass loudspeaker.

*Electro-Voice (1993) "EVX-150A 15-inch Low-Frequency Reproducer", Engineering Data Sheet P/N 531642-9339.

*Renkus-Heinz (1983) "CBH 800 Constant Directivity Horn", Technical Data Sheet RH 117-03/83.
*Renkus-Heinz (1982) "SSD 1801 Compression Driver", Technical Data Sheet RH 106-0382.
*MCM Electronics Catalog (October 1999), pg. 706, "Mylar Capacitors", order number 31-0285 (1.0 μF).

A/B tests were conducted on a loudspeaker system comprising a 15" low-frequency loudspeaker in a double chamber reflex enclosure connected in parallel with a high-frequency loudspeaker system comprising a constant directivity horn and driver wired in series with a 1 μF capacitor* Said tests indicate said loudspeaker system feels and sounds more responsive to the tactile input of playing a bass guitar than when lower acoustic and electric crossover frequencies were tested using individual 1.5 μF and 2.2 μF capacitors that are otherwise identical.*

*Electro-Voice (2002) "EVX-155 15-inch Low-Frequency Reproducer", Engineering Data Sheet P/N 38109-949.
*Renkus-Heinz (1983) "CBH 800 Constant Directivity Horn", Technical Data Sheet RH 117-03/83.
*Renkus-Heinz (1982) "SSD 1800 Compression Driver", Technical Data Sheet RH 112-3882.
*MCM Electronics Catalog (October 1999), pg. 706, "Mylar Capacitors", order numbers 31-0285 (1.0 μF), 31-0290 (1.5 μF), and 31-0295 (2.2 μF).

The Loudspeaker Passive Acoustic Grille Filter

FIGS. 6-9 illustrate the claimed crossover method with a loudspeaker grille comprising an acoustically opaque or translucent filter that passively blocks or attenuates high frequencies. Said filter reduces phase interference effects caused by a low-pass loudspeaker frequency range that overlaps that of a high-pass loudspeaker. Said filter also attenuates the axial high-directivity peak in high-frequency response exhibited by some loudspeakers. Said filter has no adverse effect on electrical signal transmission, unlike a low-pass inductive coil filter wired in series with a low-pass loudspeaker that increases the length and reduces the conductivity of signal transmission and thereby reduces system damping and articulation of said loudspeaker. The claimed passive acoustic grille filter was conceived in the late 1990's when the inventor first saw a two-way loudspeaker system with a similarly located disc having a different function described as acoustically transparent foam that reduces unwanted resonance*.

*Electro-Voice (1998) "SX500+400-Watt Two-way Speaker System", Engineering Data Sheet P/N 535397-rev.9851.

Figure 7:
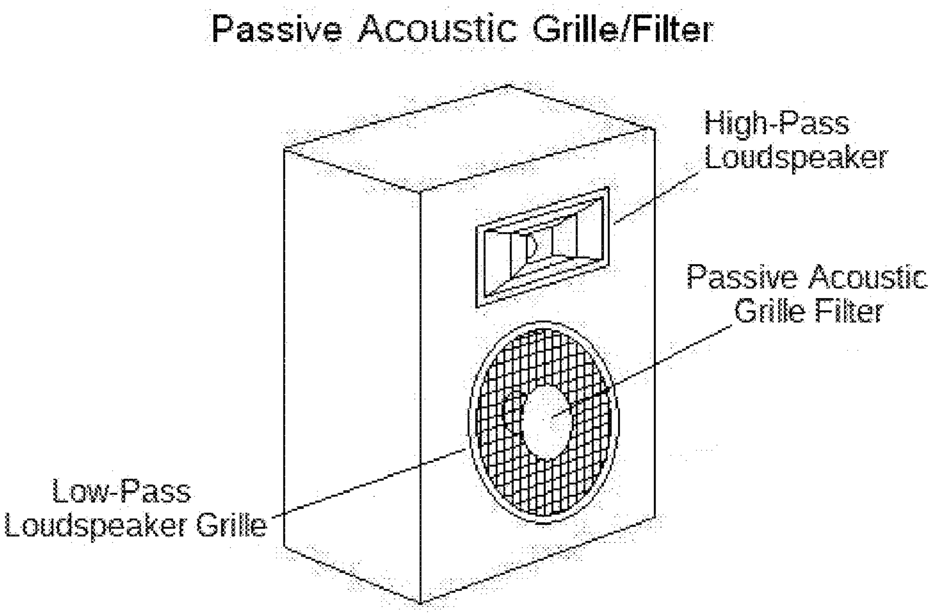
Figure 8:
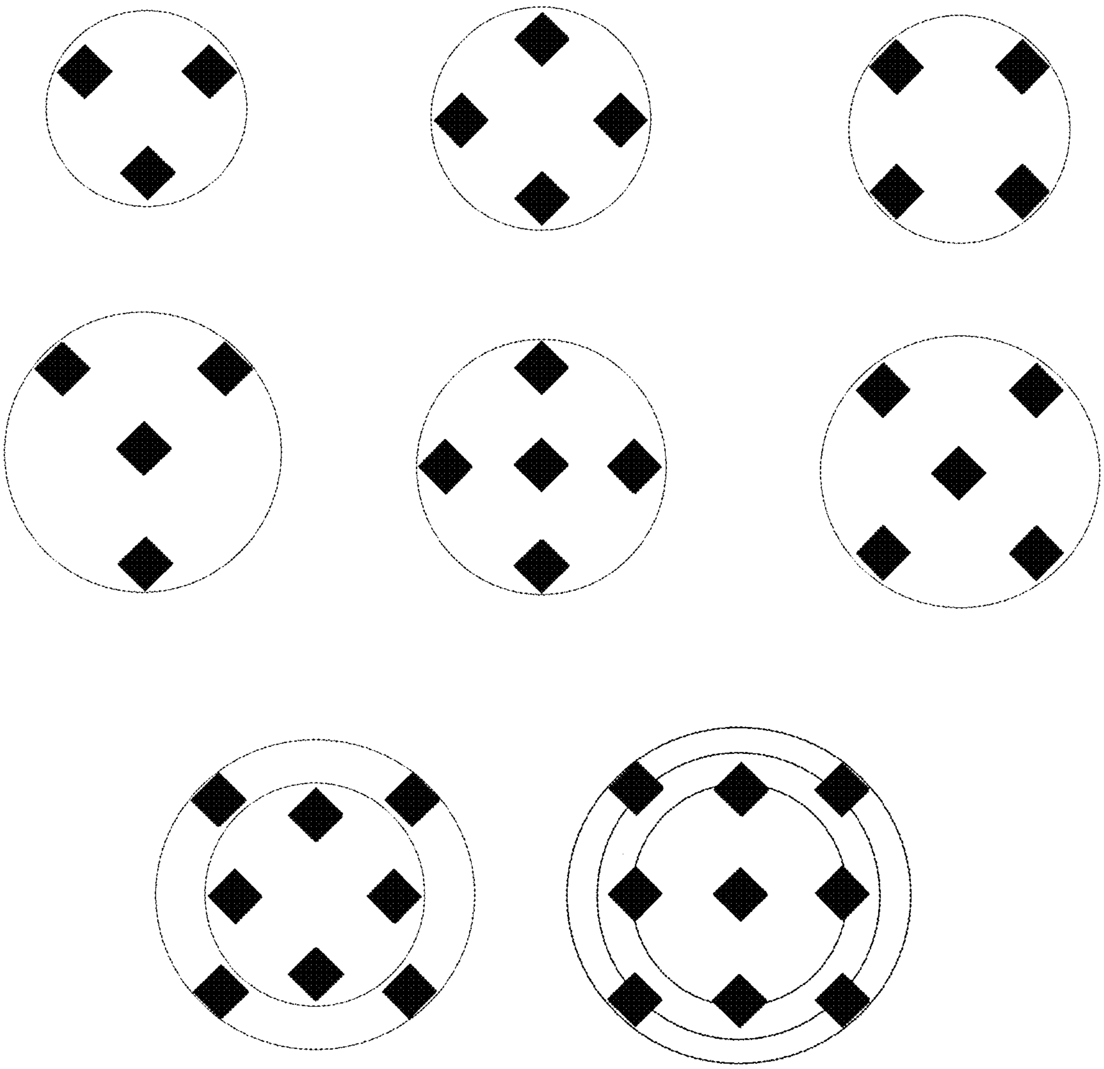
Figure 9:
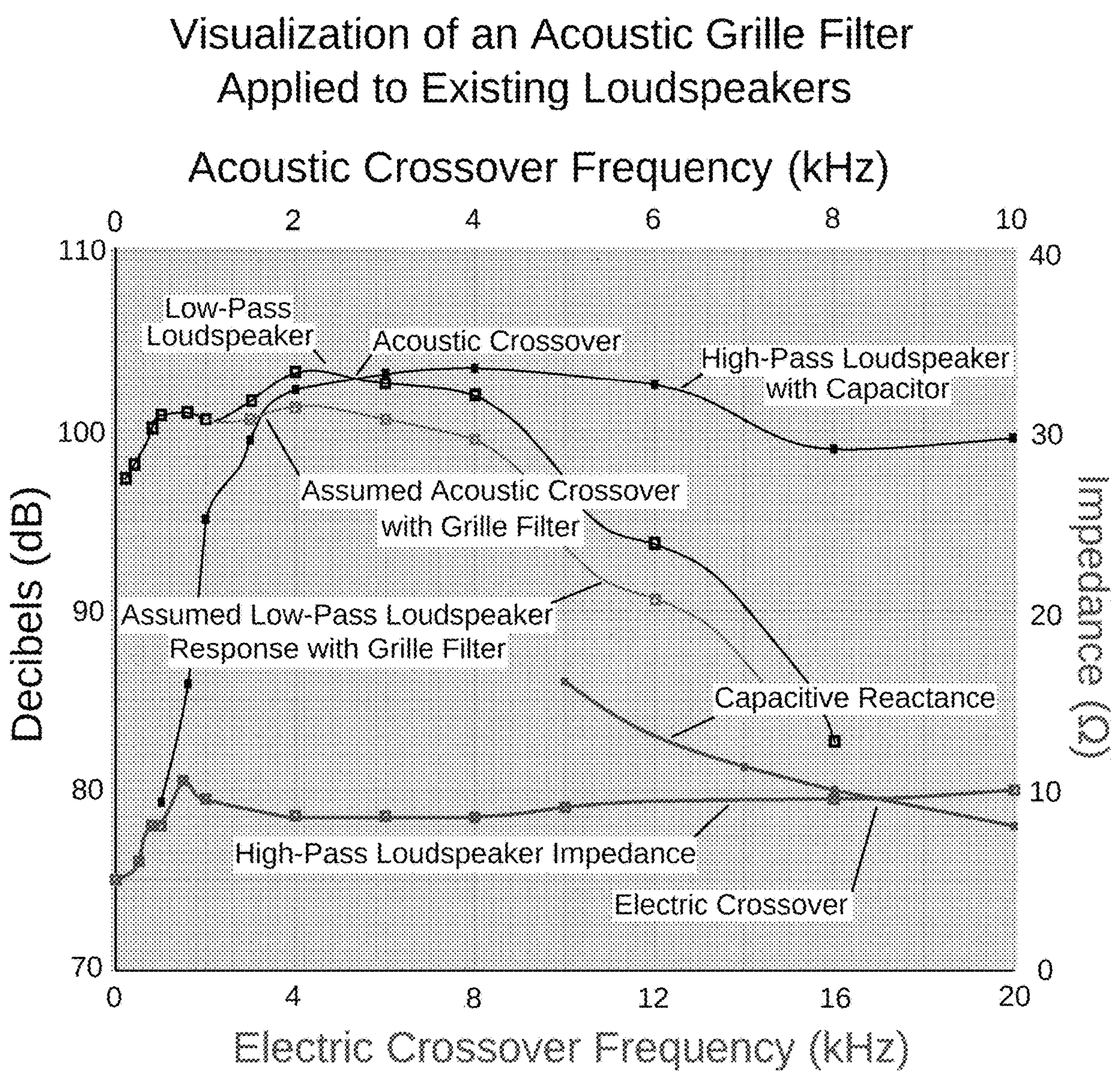

FIG. 7 illustrates a configuration of said filter axially coincident with a round ferromagnetic grille and a round loudspeaker. Said filter is either integral with the grille or attached to the front or rear of said grille with fasteners, e.g. hook and loop/Velcro, or magnetism. Said front attachment of reusable filters facilitates filter installation and removal to increase high-frequency throw, to stopgap a blown horn, and for variation of sound, filter diameter and material, and loudspeaker. Said rear attached filters preserve the appearance of cloth and foam grilles and reduce the risk of filter displacement and loss.

Prototype grille filter acoustic-sensory A/B tests with bass guitar and vocals were conducted on 6 several different 2-way loudspeaker systems each comprising a constant directivity high-pass horn having a low-frequency cut-off of either 800 Hz or 1600 Hz wired in series with a 1 μF high-pass crossover capacitor referenced above and a ferromagnetic round waffle-style loudspeaker grilles protecting a round 12" or 15" low-pass loudspeaker. Said 12" and 15" loudspeakers had high-frequency cut-offs that ranged from 1600 Hz to 5000 Hz. Grille filters made of round discs of ⅛" thick fibrous reversible carpet material capable of attaching to hook and loop/Velcro hooks were tested to determine optimum filter diameters.

Some said filters were each adhesively backed with magnetic sheet material scavenged from refrigerator calendars and centered on and magnetically attached to the front of said grille. At least one prototype filter was made exclusively of magnetic sheet material. Material having stronger magnetism than that used for said prototype grille filters is preferred for greater resistance to displacement and loss.

Other said filters were attached to said grilles each having an array of four ⅝" square or ⅞" square adhesive-backed hook and loop/Velcro hook pads. Each array occupied a diameter no larger than that of the respective filter and was centered on and adhered to the front of the respective grille. Each filter was centered on and hook and loop attached to a respective array. Said attachment has been reliable with no filters falling off and no hook pads separating from the grilles after repeated filter removal.

Hook and loop grip strength varies with the number of hooks per square inch and how well the loops grip the hooks. Since the openings in a loudspeaker grille reduce its contact area with the hook or loop pad adhesive backing, and since the hook and loop grip strength is determined by the entire area of the hook pads, strong said grip strength can pull the hook pads off the grille when removing the grille filter, requiring fewer hooks per square inch, weaker gripping loop material, less hook and loop contact area, a stronger adhesive, or greater adhesive contact area. Ribbed loop material can reduces hook and loop contact area. Grilles made without openings at predetermined hook/loop pad locations increase adhesive contact area. Hook pads with loop filters are preferred over loop pads with hook filters because materials that can attach to hook pads are common and can be used to make a replacement for a lost filter.

Said grille filter A/B tests indicate that preferred filter diameters (Df) ranged from 30% to 36% of the respective low-pass loudspeakers' effective diaphragm/piston diameters, i.e. Df ranged from $0.6\sqrt{(Sd/\pi)}$ to $0.72\sqrt{(Sd/\pi)}$ where Sd is the low-pass loudspeaker effective diaphragm/piston area. Said preferred filter diameters attenuated undesirable phase interference and axial high-frequencies with little effect on low-frequency acoustic-sensory articulation. Said A/B tests of a support stand elevated loudspeaker system indicated the onset of said attenuation occurred at 9° off-axis and rapidly increased toward the axis. Systems having low-pass loudspeakers with the largest maximum directivity index and the most frequency range overlap with the high-pass horn benefit the most from said attenuation. Filters larger than said preferred diameters provided greater high-frequency attenuation and a detectable trade-off of low-frequency transient response, which offers a convenient reversible means of varying said attenuation and response. Non-axisymmetric filters can be configured for non-axisymmetric loudspeakers and/or directivity.

Grille filter diameter user preferences are as subjective and variable as user pre-amplifier control settings. The ease and expedience of installing, removing, and varying reusable preconfigured passive acoustic grille filters to achieve a reversible preferred effect without compromising electrical signal transmission constitute novelty.

Dual Chamber Loudspeaker Enclosures

A bass reflex enclosure comprises a low-pass loudspeaker chamber and a tuning frequency provided by one or more tuned ports pneumatically linking the otherwise hermetic said chamber to the external air for extended low-frequency response, reduced distortion, increased efficiency or reduced enclosure size. A dual, or double, chamber reflex enclosure, acronymed "DCR", in which one chamber is occupied by the low-pass loudspeaker(s) and is twice the internal air volume of the second chamber, comprises three identical, or identical sets of, tuned ports pneumatically linking each otherwise hermetic said chamber to the external air and to each other and thereby provides two tuning frequencies an octave apart for an extended frequency range of bass reflex benefits.

The partition that separates said dual chambers stiffens the enclosure and, when oblique to the interior surfaces, reduces unwanted deflections, reflections and standing waves, and can form a structurally advantageous triangle, i.e. a truss. An enclosure stiffened by a partition, struts that link its central surface areas, or truss-work also allows reduced wall thickness. Acoustic-sensory bass guitar tests of loudspeaker enclosures revealed that, for identical stereo pairs of cuboid bass reflex enclosures comprising 1⅛" thick wood sides being converted to oblique partition dual chamber reflex as in FIG. 13(*a*), the first converted enclosure of the respective said pair felt and sounded more articulate than said pair's yet to be converted enclosure. Said tests also revealed that cuboid dual chamber reflex enclosures with oblique partitions as in FIGS. 11(*f*) and 18 feel and sound more articulate than similar size cuboid bass reflex enclosures comprising 25% thicker sides and otherwise identical construction and loudspeakers. Anechoic/non-planar chamber surfaces and rib-style enclosure bracing also enhance articulation.

Plural pieces of acoustic damping material lining or filling a loudspeaker enclosure chamber can detach, shift, and have many corners and surfaces that can fragment. A monolithic block of damping material sized to fill the chamber it occupies, and sculpted and channeled to prevent interference with other chamber components and functions, is consistent and uncompressed, resists shifting and settling, has fewer corners and surfaces to deteriorate, and thereby provides improved acoustic-sensory articulation and reliability for many types of loudspeaker enclosure.

FIG. 10 illustrates high-pass loudspeaker enclosures. A high-pass loudspeaker enclosure and, if applicable, an amplifier can be stacked, i.e. piggybacked, atop a low-pass loudspeaker enclosure and positioned to align the loudspeakers for correct or preferred phasing or vary the sound. Front-radiating low-pass loudspeaker acoustic-sensory articulation is better when the front of the stack is aligned vertically to simulate a larger baffle to direct sound forward. Stacking the high-pass enclosure atop the amplifier allows a shorter signal transmission cable to, and thereby improves damping of, the low-pass loudspeaker.

Figure 14:
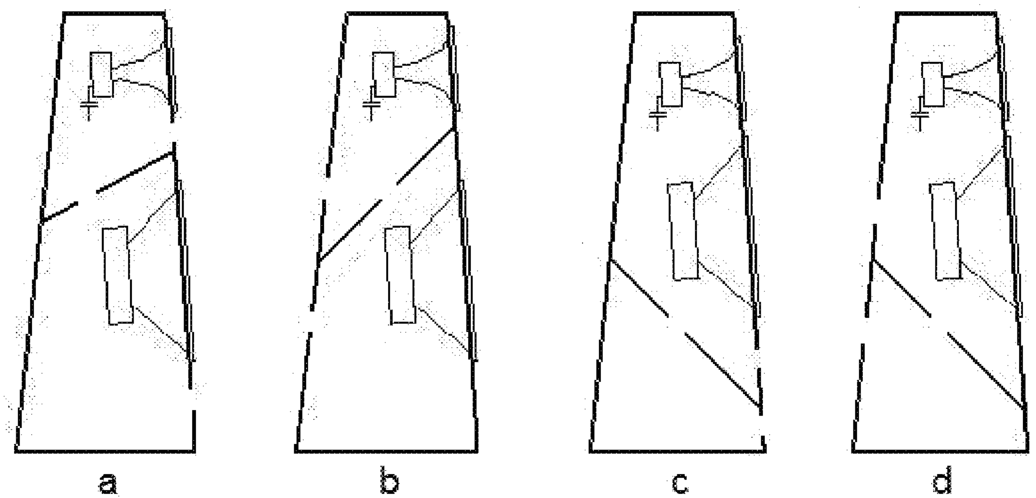
Figure 14:
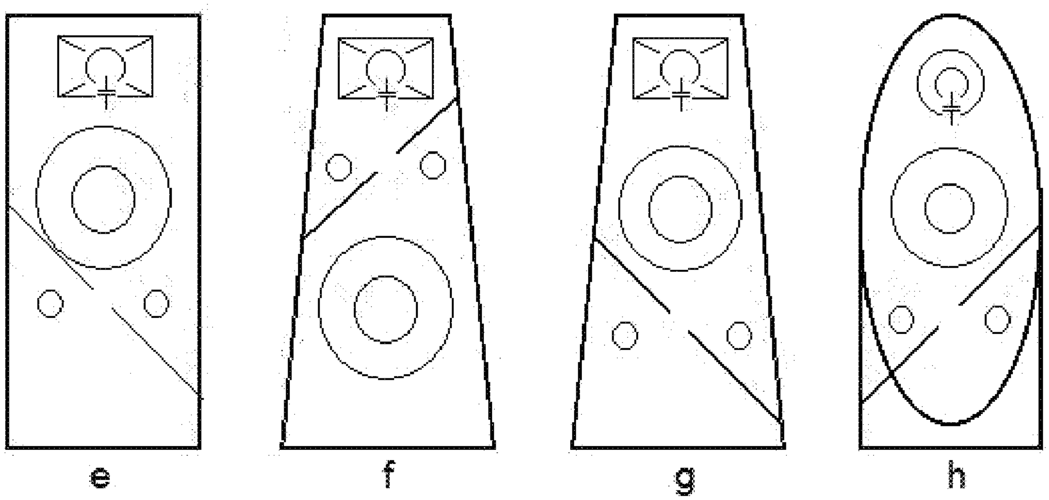
Figure 15:
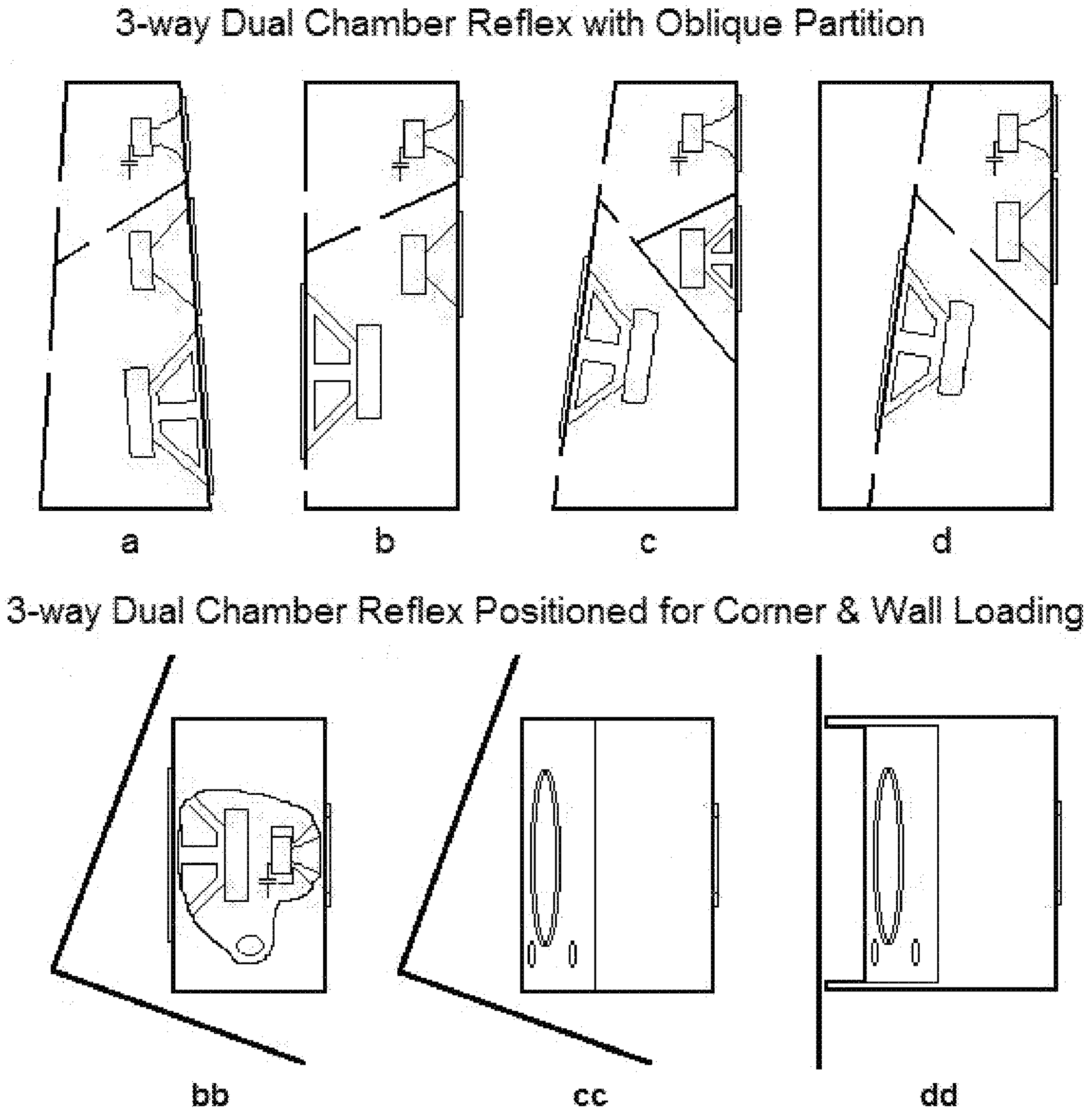

FIGS. 11-16 illustrate front ported, rear ported, horn-loaded, 2-way and 3-way variations of dual chamber reflex enclosures that comprise non-cuboid chambers. The ports can be ducted. An enclosure's front, sides, top and bottom can be orthogonal, oblique or curved. FIG. 14(*h*) illustrates a partially elliptical enclosure with an elliptical grille. FIG. 15 includes enclosures inspired by experimentation with a bass guitar loudspeaker enclosure facing backwards into a corner of a room to simulate a folded horn which made it sound more powerful at low-frequencies. A chamber hermetically sealed from the low-pass chamber(s) as illustrated in FIG. 15(*c*) accommodates a mid-range or mid-bass loudspeaker and its own tuned port(s).

FIG. 16 illustrates a dual chamber reflex loudspeaker enclosure stiffened by its oblique partition and struts fastened to its partition and sides with glue blocks, joints, or fasteners. The enclosure's back and partition and one chamber's side and struts form triangular truss-work. Front and back surface struts and rib style partition and wall bracing not shown in this example can be included. Molded enclosures can include integral stiffening features.

FIG. 17 illustrates a monolithic block of acoustic damping material sized and sculpted to fit a loudspeaker enclosure. Cavities and conduits not shown for ports, amplifiers, ventilation, wires, bracing and struts can be included. A dual chamber reflex enclosure can comprise a said block in each chamber to adiabatically maintain the chambers' internal air volume ratio.

FIGS. 18-21 illustrate wiring configurations for high-pass, low-pass, 2-way, and 2-way bi-amplified loudspeaker enclosures. The capacitor and + wire are preferably fastened to the high-pass loudspeaker to prevent rattling and provide strain relief. Capacitor lead wires are preferably connected/soldered in series with and directly to the + terminal of said loudspeaker and the + conductor of an integral signal transmission cable to maximize conductivity with integral cable strain relief also provided at the enclosure exit point. The capacitor can alternatively be connected/soldered in series with and directly to the + conductor of an enclosure's signal transmission jack(s)/terminal(s) and it's internal + high-pass signal transmission wire.

Loudspeaker Enclosure Tuning Method

A bass reflex enclosure rule is to provide the smallest tuned port area that prevents rushing air noise (Weems 1981)*. Said rule should be satisfied for applied power rather than rated maximum power because a smaller port area provides more articulate response and also obviates or shortens port ducting. A low power duct that nests inside a high power duct allows variation.

*Marsh, R. N. (March 1980), "The Double-Chamber Speaker Enclosure", *Speaker Builder*, pgs 7-8.

*Weems, D. B. (1981), *Building Speaker Enclosures* (1st ed.). Tab Books. ISBN 0-8306-1364-1.

*Weems, D. B. (April 1985), "A Small Double-Chamber Reflex", *Speaker Builder*, pgs. 14-15.

Prior art methods tune bass reflex port(s) to a fundamental enclosure frequency (Fb) that approximates or equals loudspeaker resonance frequency (Fs) to reduce high cone excursion and distortion at Fs. A dual chamber reflex is fundamentally tuned as a bass reflex enclosure having the combined internal air volume of both of its chambers and the same two exterior ports and will produce a secondary tuning an octave higher than Fb when the woofer chamber has twice the interior air volume as the smaller chamber (Marsh 1980 and Weems 1981 and 1985)*.

Acoustic-sensory A/B tests of loudspeaker system response to the tactile input of playing bass guitar sought the most articulate sounding port configuration and tuning frequency (Fb) for 15 different prototype home audio, musical instrument, and public address sound reinforcement enclosures ranging from 0.5-5.0 cubic feet, 8 of which were dual chamber reflex. Each enclosure comprised a single 8, 10, 12, or 15" woofer rated from 20-70 Hz (Fs), 0.15-0.45 (Qts), and 25-500 watts RMS and was tested with a 35-400 watt RMS amplifier at volume levels that did not require ear plugs in a 200 $ft^2$ living room or 550 $ft^2$ basement. The most articulate sounding port ranged from ¾" to 1.5" diameter for bass reflex and from 0.7" to 1" diameter for dual chamber reflex, most comprising a 1.7" to 7" duct. For 10 said enclosures, 5 of which were dual chamber reflex, the most articulate sounding Fb was from 1 to 3 octaves below Fs, often infrasonic, and sometimes an octave or ½ octave series undertone of Fs. Fb was estimated using the equation for bass reflex enclosures below*. For dual chamber reflex enclosures Lv and r equal the length and radius of each port respectively, Sv equals the combined area of the external ports, Vb is the combined air volume of both chambers, Fb is the fundamental tuning frequency of the combined chambers, and the secondary tuning frequency (Fb2) of the larger chamber is Fb2=2×Fb.

*Electro-Voice (1993) "EVX-150A 15-inch Low-Frequency Reproducer", Engineering Data Sheet P/N 531642-9339.

$$Lv=Sv/(0.00037VbFb^2)-Kr \text{ or, solving for } Fb,\ Fb=\sqrt{[Sv/0.00037\ Vb(Lv+Kr)]}$$

Where:

- Lv=Length of vent in inches or thickness of baffle for hole in baffle
- Sv=Area of vent in square inches
- Vb=Volume of box in cubic feet
- Fb=Box tuning in Hz
- r=radius of vent in inches
- K=1.7 for a hole in baffle, 1.5 for a tube Therefore, an alternative method of tuning bass reflex and dual chamber reflex enclosures is to begin with an estimate of the minimum port area/diameter in the respective range discussed above for an initial Fb=Fs, then check to see if port air noise is produced by low-frequencies at the intended loudness. If so, incrementally increase port areas/diameters until said noise is prevented. If not, incrementally decrease port areas/diameters until said noise occurs and select the smallest noise-free area/diameter. Then use acoustic-sensory A/B comparisons of said selection and variations comprising ducts of incrementally increasing length to determine if a lower tuning frequency improves articulation free of said noise. Observe the loudspeaker cone at low-frequencies for verification that it is well controlled, especially around and below Fs. If not, iterate the tuning, enclosure design, and/or loudspeaker selection until said control is achieved.

Said A/B comparisons are easier by repeatedly and quickly toggling between said variations. When plural and otherwise identical enclosures are not available to toggle said variations, a single enclosure can be used to toggle rough said variations by applying tape to reduce port area, inserting rolled up paper to simulate a duct, inserting rods or sticks into ducts or nesting ducts to reduce area, and by attaching protruding duct extensions with adhesive tape for quick access.

The final Fb is estimated by applying the final port dimensions to a reliable analytical method, although the alternative tuning method discussed above does not depend upon it. The application of human senses to A/B comparisons of design variations is more relevant and reliable than an analytical Fb method that does not account for all of the essential variables.

Amplifiers

High-ampacity integral preamplifier and power amplifier power cords and signal transmission input and output cables and connectors improve acoustic-sensory articulation.

Capacitor type and specifications affect said articulation. A/B tests of pre-amplifier tone control circuits revealed that 2 parallel wired 0.01 uf, 2000 v, high Q ceramic disc capacitors provided more articulation than one 0.022 uf, 400 v, film capacitor.

Acoustic-sensory A/B tests with bass guitar of systems comprising 60-80 watt RMS tube and 200-300 watt RMS transistor mono amplifiers rated for either 4, 4 and 8, or 2-8 ohm loads and a variety of 8 ohm loudspeakers revealed that each system was more articulate with one loudspeaker than with said loudspeaker connected/wired in parallel with a second loudspeaker regardless of whether or not said loudspeakers were identical. The amplifier power required to articulate sound with the moving mass of one or more loudspeakers is ultimately constrained by wall outlet ampacity and voltage.

Power and Signal Transmission

High-ampacity and redundant conductors, connectors and connector contact points and integral minimum length power cords and signal transmission cables all made of high electrical conductivity materials maximize acoustic-sensory articulation. Integral power cords and signal transmission cables with only one end comprising a connector reduce connector issues including inadequate, degraded and failed electrical contact, shorts, and vibration noise.

Redundant ground cable, i.e. acronymed RG cable, comprises 3 or more conductors with plural ground conductors. Acoustic-sensory A/B tests of 14 gauge stranded copper cables indicate that a 3 conductor redundant ground cable provides greater articulation than that of a 2-conductor cable as well as that of a 3-conductor cable wired with redundant + conductors. Power and signal transmission cables comprising the acoustic-sensory optimum ratio of +/− electrical conductivity or conductor cross section, acronymed AO cable, are therefore advantageous.

Redundant cable A/B tests of 1 yard long stranded copper loudspeaker cables indicated said articulation is better with a 14 gauge cable than with a 16 gauge cable and further improved with each redundant cable when three 14 gauge redundant ground cables were connected/wired to the same loudspeaker driver and cumulatively connected to the amplifier's three ¼" phone jacks.

Although connectors of higher ampacity than that of a ¼" phone plug are preferred for all signal transmission, a ¼" phone plug can be mounted on a 14 gauge redundant ground cable if the plug sleeve inside diameter and cable hole diameter are large enough. A jumbo ¼" phone plug similarly fits 12 gauge or larger cable although cable stiffness and weight increase connector stress. A/B tests of signal transmission cables comprising mono ¼" phone plugs connecting a bass guitar to a mono amplifier comprising dual parallel wired input jacks indicate 6' long 14 gauge stranded copper redundant ground cable transmits more articulate and robust bass than not only 5' standard gauge high resolution double shielded audio interconnect cable but also y-cable comprising twin 7' said shielded cables merged into a jumbo plug occupying said guitar's output jack with the duplex end plugs occupying said amplifier jacks. A/B tests also indicated that 2' long 14 gauge stranded copper redundant ground preamplifier-to-power amplifier signal transmission cable transmits more articulate and robust bass than 2' conventional shielded cable. The lack of shielding of said 14 gauge cables was not an issue with active electronic guitars and preamplifier-to-power amplifier connections and some passive electronic guitars in the single-family house test environment. Shielded redundant ground cable, acronymed SRG, can use the shield as one of the redundant ground conductors.

Phone plugs must be fully inserted into jacks to prevent the + tip of the plug from shorting out on a ground contact point. This is especially true with 3 conductor redundant ground jacks because said jacks have 2 positions that a phone plug will engage, the first of which is not fully inserted and shorts the + tip of the plug on one of the jack's redundant ground contact points. A live phone plug cable should be neither inserted nor removed from any jack, especially if the amplifier lacks output protection features. Redundant speaker cables connected to the same loudspeaker are all live if any said cable is connected to the amplifier. 3 conductor phone plugs have solder lugs that can loosen, rotate and electrically short the signal and are less suitable for heavy gauge wire and speaker connections than 2 conductor phone plugs.

Figure 22:
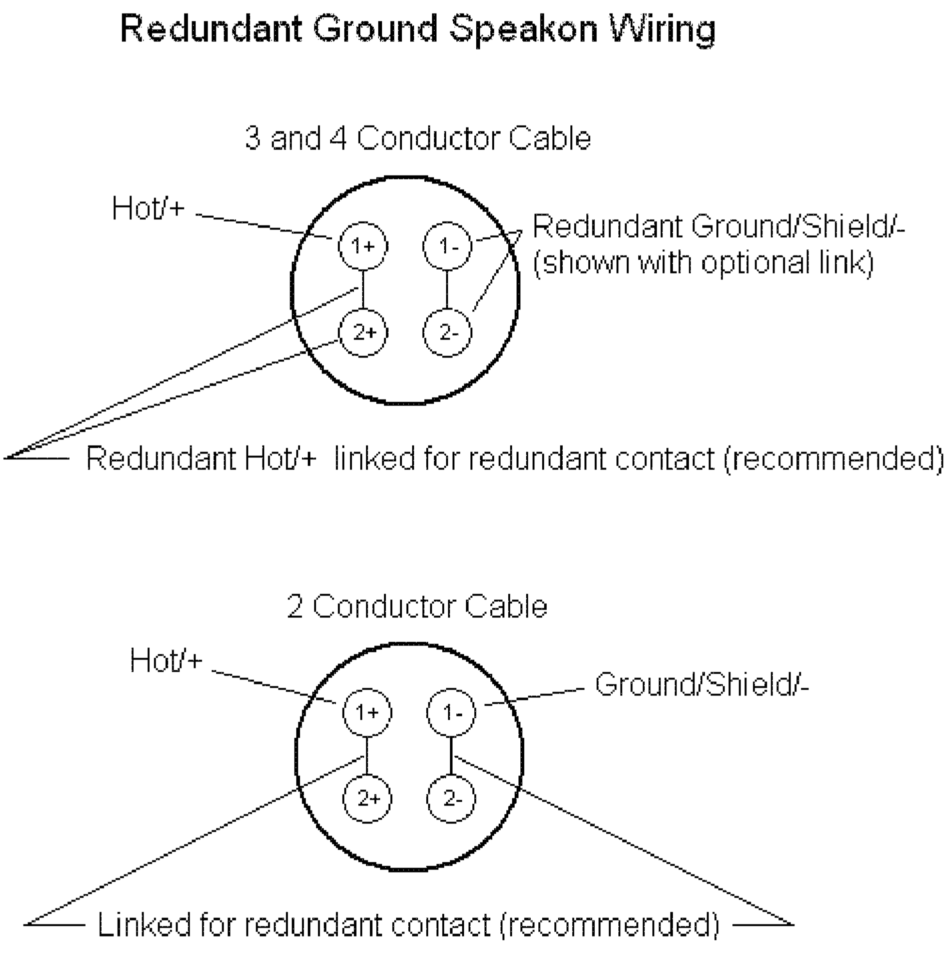

FIGS. 22-25 illustrate redundant ground wiring of connectors with 2, 3 and 4 conductor cable. Although FIG. 22 shows only one 4 conductor model of high-ampacity Speakon connector, said wiring applies to all applicable connectors.

Figure 23:
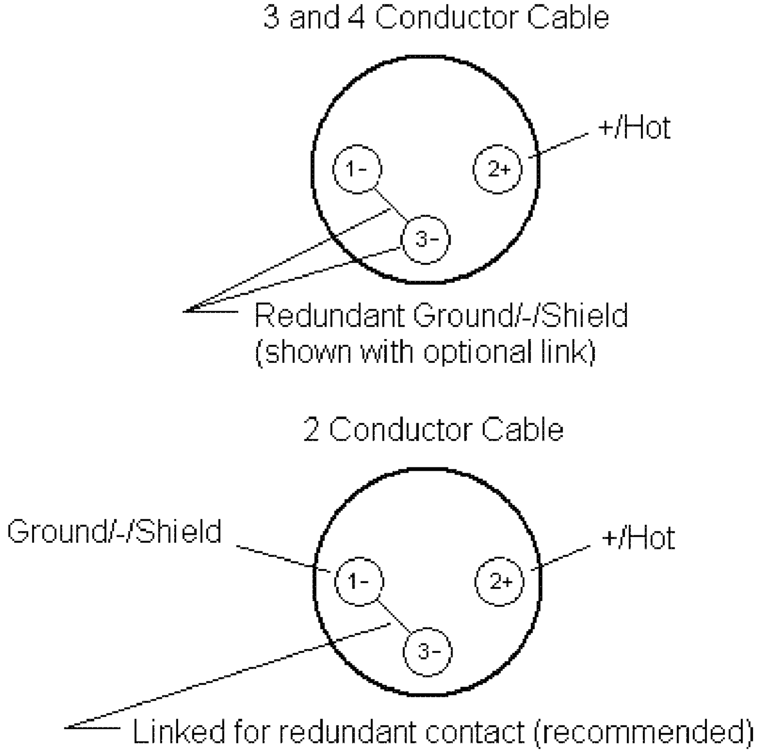

FIG. 23 illustrates interchangeable redundant ground XLR connectors for 2, 3, and 4 conductors and cautions that XLR pin polarities have not always been standardized as shown.

Figure 24:
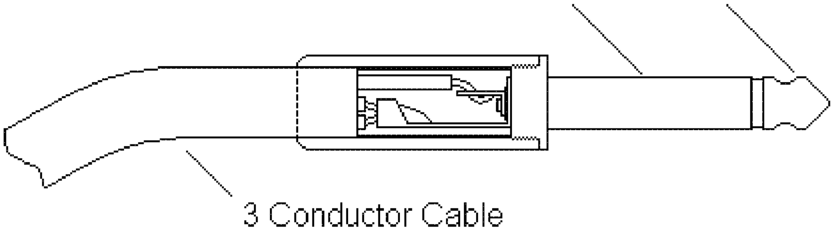
Figure 25:
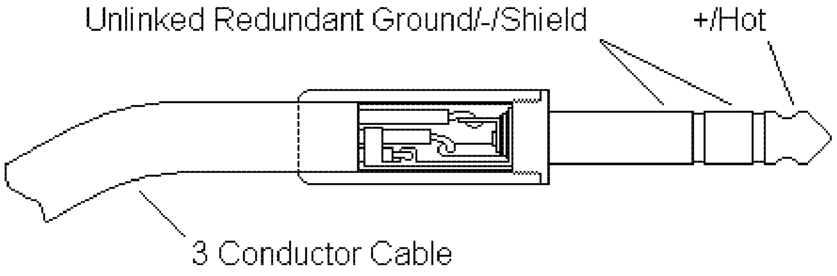
Figure 25:
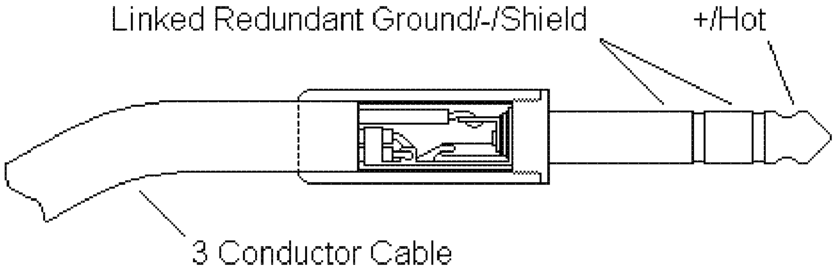
Figure 25:
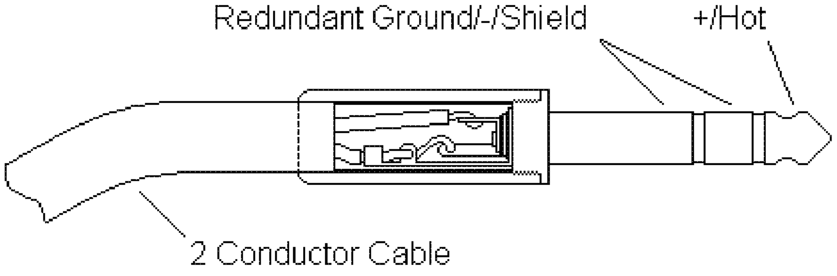

FIGS. 24 and 25 illustrate interchangeable 2 and 3 conductor redundant ground wired phone plugs and jacks. A 2 conductor phone plug makes redundant ground contact with a 3 conductor redundant ground phone jack. Although a 3 conductor redundant ground phone plug has an inactive redundant ground with a 2 conductor phone jack, if said plug is on redundant ground cable, the redundant cable conductors all function if linked within said plug as shown in FIG. 25. Phone plug strain relief features grip the jacket of any or all conductors or grip, or are also soldered to, the ground, −, or shield conductor(s).

Figure 29:
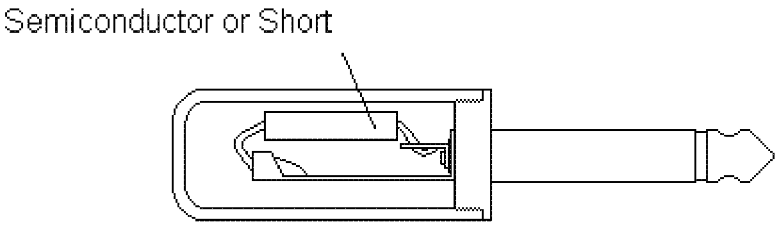

FIGS. 26-28 are discussed above in The Crossover Method subsection. FIG. 29 shows a signal connector plug comprising a semiconductor or short circuit for use with a parallel or serial preamplifier input jack to vary the input characteristics/sensitivity or mute the input during signal source plug-in.

Carrying Handles, Straps, and Support Stands

Musical instrument and sound reinforcement equipment comprise carrying handles and support stand receptacles that can be located for least gravity induced torque. The handle or said receptacle is therefore centered on the vertical axis of the equipment's center of mass. As illustrated in FIG. 30, this can be determined by setting the equipment on a cylindrical rod that is perpendicular to the long axis of the equipment or handle mounting surface, rolling the equipment on the rod until it balances, and marking a line across said surface that is in the vertical plane of the rod. Repeat the procedure with the rod oriented parallel to said axis. Center the handle where the two lines intersect and with the hand grip parallel to said axis.

What I claim as my invention are:

1. An apparatus comprising:

A dual chamber reflex loudspeaker enclosure, wherein said enclosure comprises one or more low-frequency loudspeaker(s) and two chambers separated by a partition, wherein the first said chamber comprises said loudspeaker (s) that bound(s) and interact(s) with the air inside said first chamber, wherein the internal air volume of said first chamber is twice that of said second chamber, wherein said second said chamber comprises no loudspeaker that interacts with the air inside said second chamber, wherein said partition is oblique to one or more interior surface(s) of said first chamber, wherein said partition comprises one or more bass reflex port(s) that connects the air inside said chambers, wherein each said chamber further comprises one or more bass reflex port(s) that connects the air inside each said chamber directly to free air unbound by said enclosure, wherein said ports are sized to produce more than one bass reflex tuning frequency, wherein said tuning frequencies include a fundamental tuning frequency that is not greater than the frequency that approximates or equals the resonance frequency of said loudspeaker(s), wherein said tuning frequencies also include a second tuning frequency that approximates or equals an octave overtone of said fundamental frequency.

2. The apparatus of claim 1, wherein said partition is perpendicular to not more than two interior enclosure surfaces.

3. The apparatus of claim 1, wherein said partition is oblique to all interior enclosure surfaces.

4. The apparatus of claim 1, wherein said enclosure includes one or more trussed struts or truss-works that stiffen the loudspeaker enclosure surfaces.

5. The apparatus of claim 1, wherein each said chamber includes a monolithic block of acoustic damping material sized and sculpted to fill said chamber.

6. The apparatus of claim 1, wherein said enclosure includes one or more integral signal transmission cable(s) and connector(s) that preferably have high ampacity, wherein said cables comprise positive and negative electrical signal conductors sized for an audio-sensually optimum ratio of positive/negative electrical conductivity or conductor cross-section.

7. The apparatus of claim 1, wherein said ports are identically sized.

8. The apparatus of claim 1, wherein said fundamental tuning frequency approximates or equals said resonance frequency.

9. The apparatus of claim 1, wherein said fundamental tuning frequency is more than 12 octave below the transducer resonance frequency.

10. The apparatus of claim 9, wherein said tuning frequency is infrasonic.

11. The apparatus of claim 9, wherein said tuning frequency approximates or equals a 12 octave series undertone of said resonance frequency.

12. The apparatus of claim 11, wherein said tuning frequency is infrasonic.

13. An apparatus comprising:

A dual chamber reflex loudspeaker enclosure, wherein said enclosure comprises one or more low-frequency loudspeaker(s) and two chambers separated by a partition, wherein the first said chamber comprises said loudspeaker (s) that bound(s) and interact(s) with the air inside said first chamber, wherein the internal air volume of said first chamber is twice that of said second chamber, wherein said second said chamber comprises no loudspeaker that interacts with the air inside said second chamber, wherein said partition comprises one or more bass reflex port(s) that connects the air inside said chambers, wherein each said chamber further comprises one or more bass reflex port(s) that connects the air inside each said chamber directly to free air unbound by said enclosure, wherein said ports are sized to produce more than one bass reflex tuning frequency, wherein said tuning frequencies include a fundamental tuning frequency that is more than ½ octave below the loudspeaker resonance frequency, wherein said tuning frequencies also include a second tuning frequency that approximates or equals an octave overtone of said fundamental frequency.

14. The apparatus of claim 13, wherein said enclosure includes one or more integral signal transmission cable(s) and connector(s) that preferably have high ampacity, wherein said cables comprise positive and negative electrical signal conductors sized for an audio-sensually optimum ratio of positive/negative electrical conductivity or conductor cross-section.

15. The apparatus of claim 13, wherein said tuning frequency is infrasonic.

16. The apparatus of claim 13, wherein said tuning frequency approximates or equals a 1% octave series undertone of said resonance frequency.

17. The apparatus of claim 16, wherein said tuning frequency is infrasonic.

* * * * *